United States Patent
Kibayashi et al.

(10) Patent No.: US 11,971,084 B2
(45) Date of Patent: Apr. 30, 2024

(54) SUPPORT APPARATUS

(71) Applicant: Mitsubishi Electric Corporation, Tokyo (JP)

(72) Inventors: Yusuke Kibayashi, Tokyo (JP); Noboru Kawaguchi, Tokyo (JP); Junji Takaki, Tokyo (JP); Naoki Okada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/143,617

(22) Filed: May 5, 2023

(65) Prior Publication Data
US 2023/0272839 A1    Aug. 31, 2023

Related U.S. Application Data

(62) Division of application No. 17/634,555, filed as application No. PCT/JP2020/031111 on Aug. 18, 2020, now Pat. No. 11,686,370.

(30) Foreign Application Priority Data

Aug. 19, 2019 (JP) .................................. 2019-149896

(51) Int. Cl.
*F16G 13/16* (2006.01)
*F16L 3/23* (2006.01)
(Continued)

(52) U.S. Cl.
CPC ............... *F16G 13/16* (2013.01); *F16L 3/23* (2013.01); *F16L 3/26* (2013.01); *H02G 11/006* (2013.01)

(58) Field of Classification Search
CPC .......... F16L 3/015; F16L 13/16; F16M 11/40; F16G 13/16; F16F 15/08; F16F 2224/02; H02G 11/006
See application file for complete search history.

(56) References Cited

U.S. PATENT DOCUMENTS 8,575,486 B2     11/2013  Jaeker et al.
10,088,015 B2 *  10/2018  Theiss ................... F16G 13/16
(Continued)

FOREIGN PATENT DOCUMENTS

| JP | 50-27982 A | 3/1975 |
| JP | 9-235073 A | 9/1997 |
| JP | 2016-132060 A | 7/2016 |

OTHER PUBLICATIONS

International Search Report and Written Opinion dated Nov. 2, 2020, received for PCT Application PCT/JP2020/031111, Filed on Aug. 18, 2020, 10 pages.

*Primary Examiner* — Nkeisha Smith
(74) *Attorney, Agent, or Firm* — XSENSUS LLP

(57) ABSTRACT

A support apparatus includes: a protective frame connected body to hold a plurality of protection targets flexibly, each protection target being a flexible cable or pipe having one end connected to a fixed-side member and the other end connected to a movable-side member that moves relative to the fixed-side member, the protective frame connected body having a bending portion bent in a middle, an upper side and a lower side of the protective frame connected body overlapped vertically; a lower supporter to support the lower side of the protective frame connected body; and a plurality of upper supporters, each of the plurality of upper supporters supporting the upper side of the protective frame connected body at a predetermined position of the protective frame connected body and being moved by movement of the movable-side member to pass the bending portion without being in contact with the bending portion.

5 Claims, 24 Drawing Sheets

(51) Int. Cl.
*F16L 3/26* (2006.01)
*H02G 11/00* (2006.01)

(56) References Cited

U.S. PATENT DOCUMENTS

| | | | |
|---|---|---|---|
| 10,811,860 B2* | 10/2020 | Katoh | H02G 3/0456 |
| 11,686,370 B2* | 6/2023 | Kibayashi | F16G 13/16 |
| | | | 248/68.1 |
| 11,824,333 B2* | 11/2023 | Hermey | F16G 13/16 |
| 2022/0390039 A1* | 12/2022 | Kibayashi | F16G 13/16 |

* cited by examiner

| $θ_R$(deg) | $5_1$ | $5_2$ | $5_3$ | $5_4$ | $5_5$ | $5_6$ | $5_7$ | $5_8$ |
|---|---|---|---|---|---|---|---|---|
| ⋮ | ⋮ | ⋮ | ⋮ | ⋮ | ⋮ | ⋮ | ⋮ | ⋮ |
| 41.8〜7.6 | SUPPORT | SUPPORT | SUPPORT | OPEN | SUPPORT | SUPPORT | SUPPORT | SUPPORT |
| 7.5〜-7.5 | SUPPORT | SUPPORT | SUPPORT | OPEN | OPEN | SUPPORT | SUPPORT | SUPPORT |
| -7.6〜-41.8 | SUPPORT | SUPPORT | SUPPORT | SUPPORT | OPEN | SUPPORT | SUPPORT | SUPPORT |
| ⋮ | ⋮ | ⋮ | ⋮ | ⋮ | ⋮ | ⋮ | ⋮ | ⋮ |

SUPPORT APPARATUS

CROSS-REFERENCE TO RELATED APPLICATIONS

The present application is a Divisional of U.S. application Ser. No. 17/634,555, filed Feb. 11, 2022, which is based on PCT filing PCT/JP2020/031111, filed Aug. 18, 2020, which claims priority to JP 2019-149896, filed Aug. 19, 2019, the entire contents of each are incorporated herein by reference.

TECHNICAL FIELD

The present disclosure relates to a support apparatus that supports a protective frame connected body to protect and hold flexibly a plurality of flexible cables or pipes each having one end connected to a fixed-side member and the other end connected to a movable-side member.

BACKGROUND ART

A large structure having a movable-side member, such as a telescope and an antenna, includes a support apparatus that supports rotatably cables or pipes for transmitting energy and information between the movable-side member and a fixed-side member. In a large structure such as a telescope and an antenna that requires precise driving, it is necessary to reduce friction and the like that is generated at the time of driving in order to maximize its performance.

In recent years, telescopes and antennas become larger and larger. The support apparatuses that support rotatably cables or pipes also become larger. In the support apparatuses having the same structure as conventional ones, the friction at the time of driving would increase with increase in size of the apparatuses. In the support apparatus, a cable guide in which protective frame bodies that are frame bodies having a plurality of holes each individually allowing a cable or a pipe to pass through are connected in the direction in which the cable extends is supported by a plurality of supporters having rollers. The positions of the supporters are not moved. The roller rolls in response to movement of the cable guide (protective frame connected body), and the supporters support the cable guide at different positions. This mechanism can prevent sagging of the cable guide and can support the large cable guide.

Furthermore, a bending portion that is bent in a semicircular shape connects the cable guide extending above and below. When the bending portion of the cable guide moves, the supporter is pushed by the bending portion, and the supporter is retracted (see PTL 1).

CITATION LIST

Patent Literature

PTL 1: U.S. Pat. No. 8,575,486

SUMMARY OF INVENTION

Technical Problem

In the structure disclosed in PTL 1, it is difficult to move the movable-side member with required accuracy due to rolling friction between the protective frame connected body and the supporters.

Solution to Problem

A support apparatus according to the present disclosure includes: a protective frame connected body to hold a plurality of protection targets flexibly, each protection target being a flexible cable or pipe having one end connected to a fixed-side member and the other end connected to a movable-side member that moves relative to the fixed-side member, the protective frame connected body including a plurality of protective frame bodies connected flexibly in an extending direction that is a direction in which the protection targets extend, each of the protective frame bodies having a plurality of holes to allow the protection targets to pass through and having a predetermined length in the extending direction, the protective frame connected body having a bending portion bent in a middle, an upper side and a lower side of the protective frame connected body being overlapped vertically; a lower supporter to support the lower side of the protective frame connected body; a plurality of upper supporters, each of the plurality of upper supporters supporting the upper side of the protective frame connected body at a predetermined position of the protective frame connected body and being moved by movement of the movable-side member to pass the bending portion without being in contact with the bending portion; a plurality of detection sensors, each of the plurality of detection sensors to detect the bending portion present at a predetermined position relative to each of the plurality of upper supporters; and an upper supporter opening/closing controller to move each of the plurality of upper supporters from a support position for supporting the upper side of the protective frame connected body to an open position that is a position never being in contact with the bending portion when the detection sensor detects that any of the plurality of the upper supporters supporting the upper side of the protective frame connected body is close to the bending portion, and to move the upper supporter to the support position when it is detected that the upper supporter in the open position is able to support the upper side of the protective frame connected body by moving to the support position, based on object detection information that is information indicating whether or not the bending portion detected by the detection sensor is present at the predetermined position.

Advantageous Effects of Invention

The present disclosure can reduce friction that is generated between the protective frame connected body and the supporters when the movable-side member moves.

DESCRIPTION OF EMBODIMENTS

First Embodiment

Figure 1:
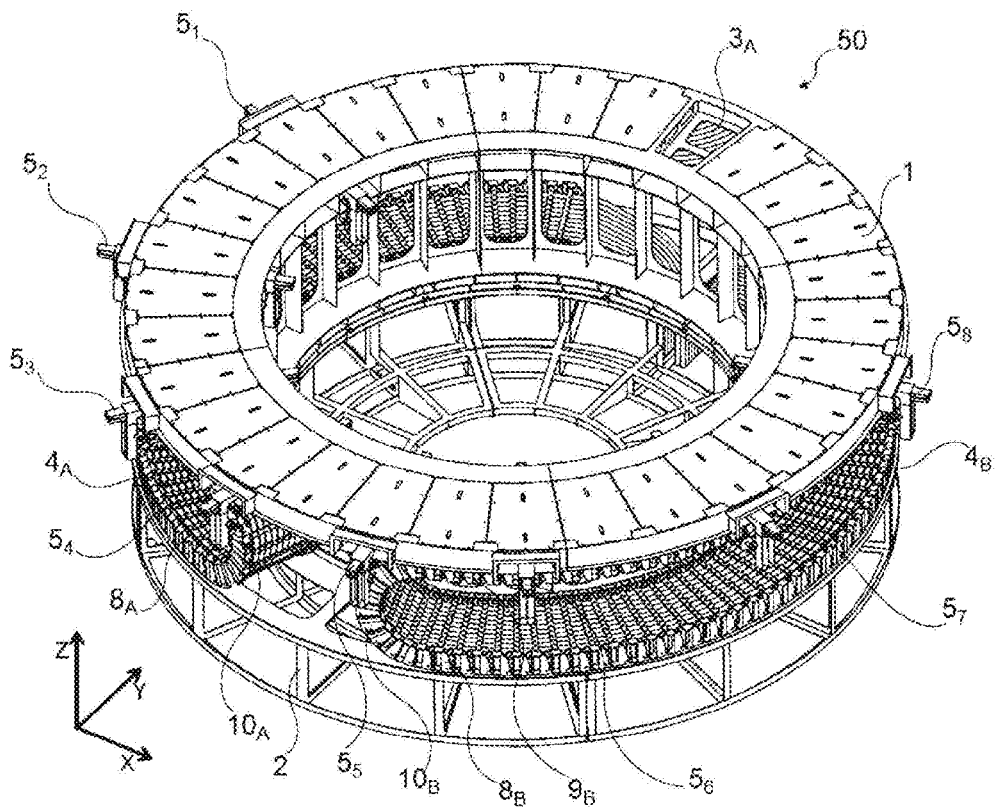
FIG. 1 is a perspective view illustrating the structure of a rotational winding support apparatus according to a first embodiment.
Figure 2:
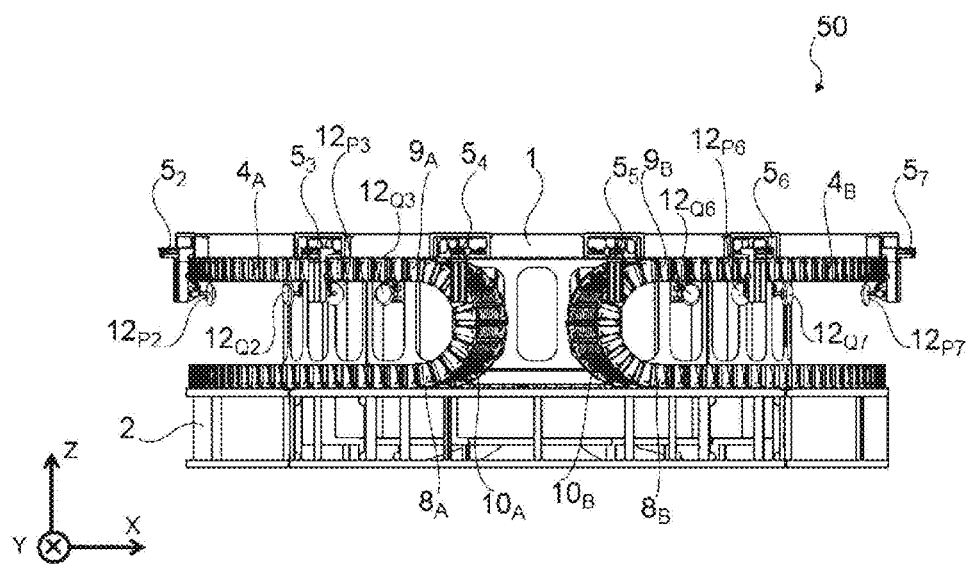
FIG. 2 is a front view illustrating the structure of the rotational winding support apparatus according to the first embodiment.
Figure 3:
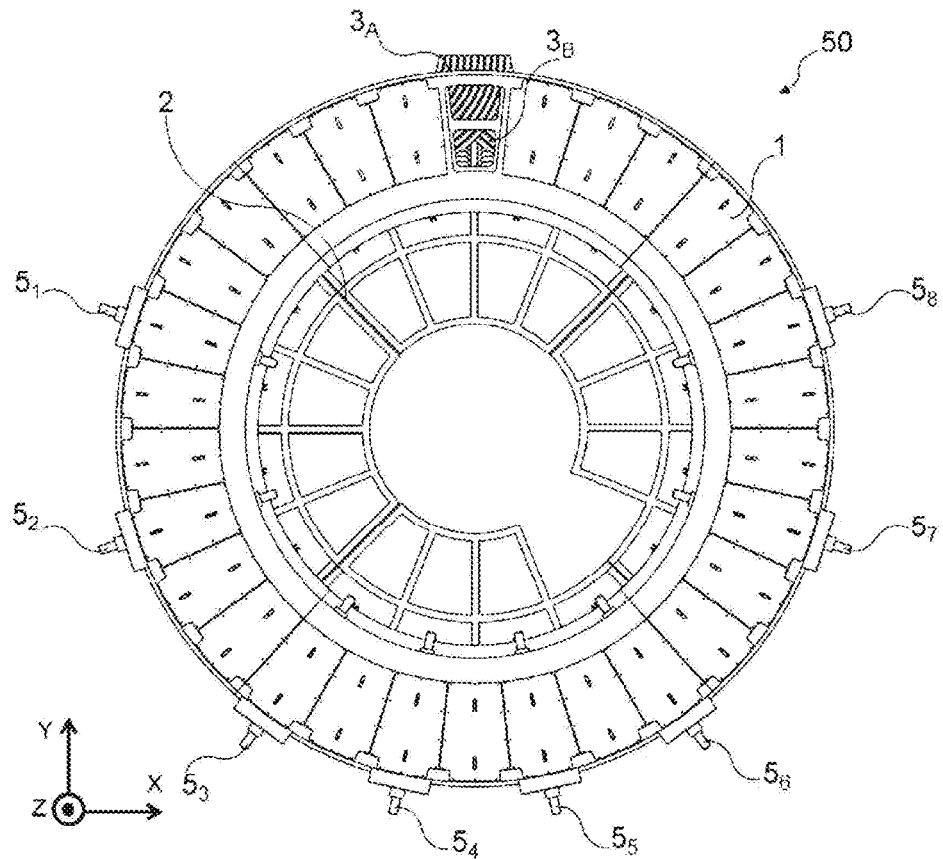
FIG. 3 is a plan view illustrating the structure of the rotational winding support apparatus according to the first embodiment.
Figure 4:
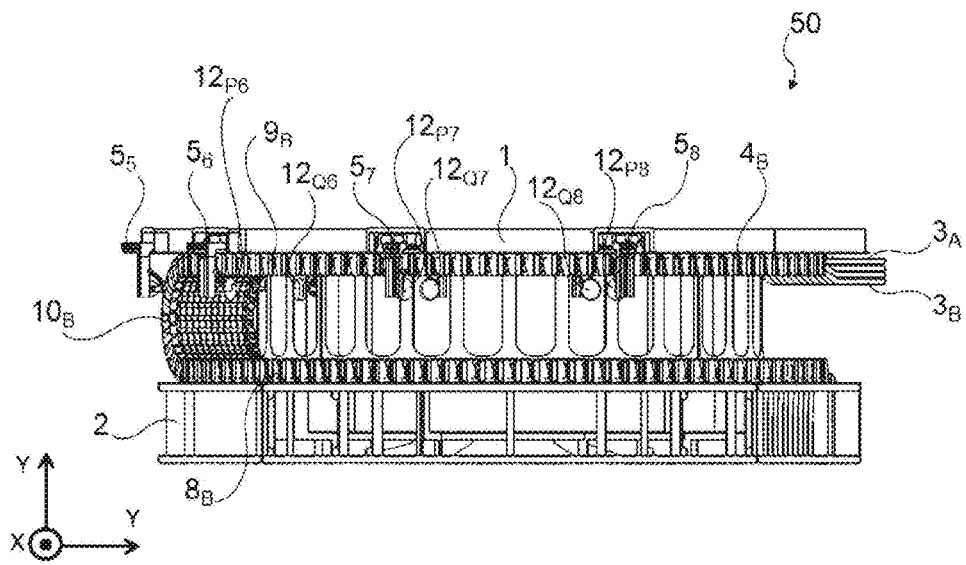
FIG. 4 is a right-side view illustrating the structure of the rotational winding support apparatus according to the first embodiment.
Figure 5:
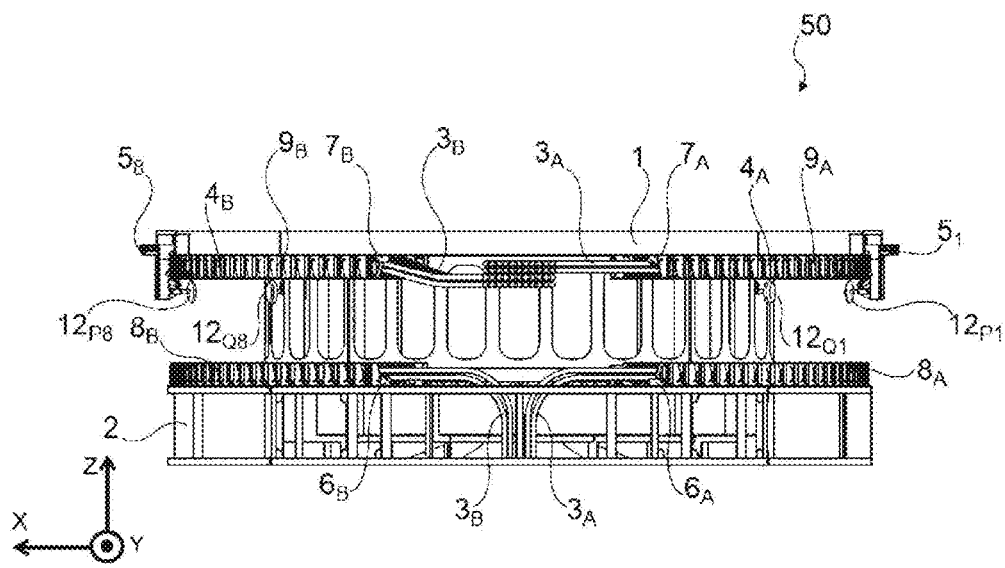
FIG. 5 is a rear view illustrating the structure of the rotational winding support apparatus according to the first embodiment.
Figure 6:
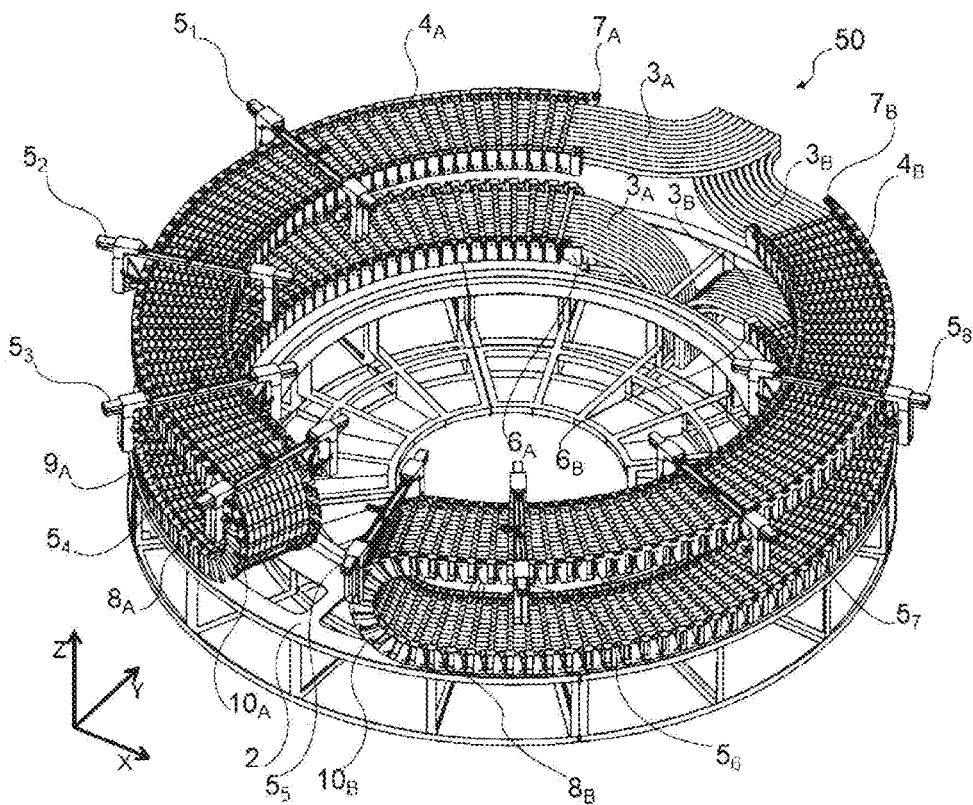
FIG. 6 is a perspective view illustrating the structure of the rotational winding support apparatus according to the first embodiment, not showing a movable-side member.
Figure 7:
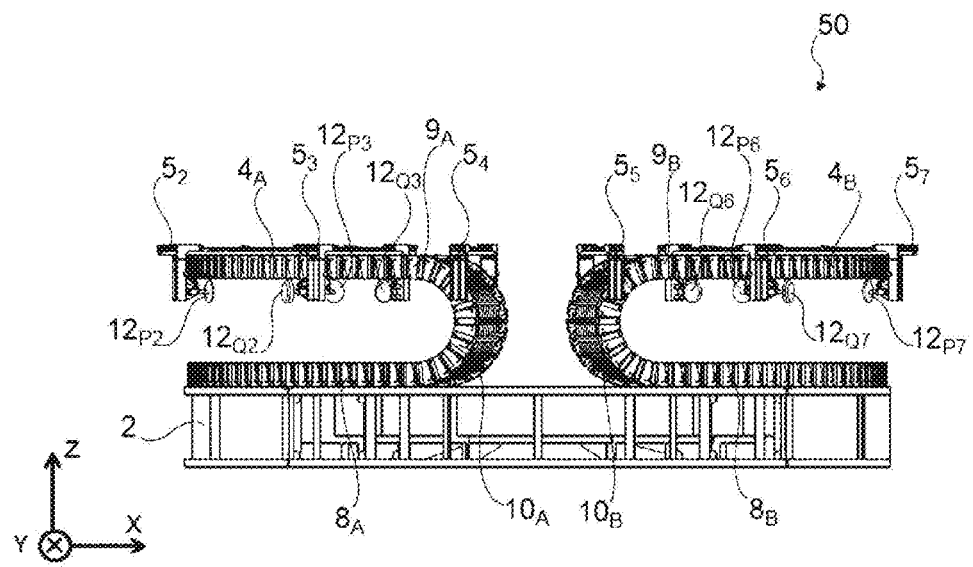
FIG. 7 is a front view illustrating the structure of the rotational winding support apparatus according to the first embodiment, not showing the movable-side member.
Figure 8:
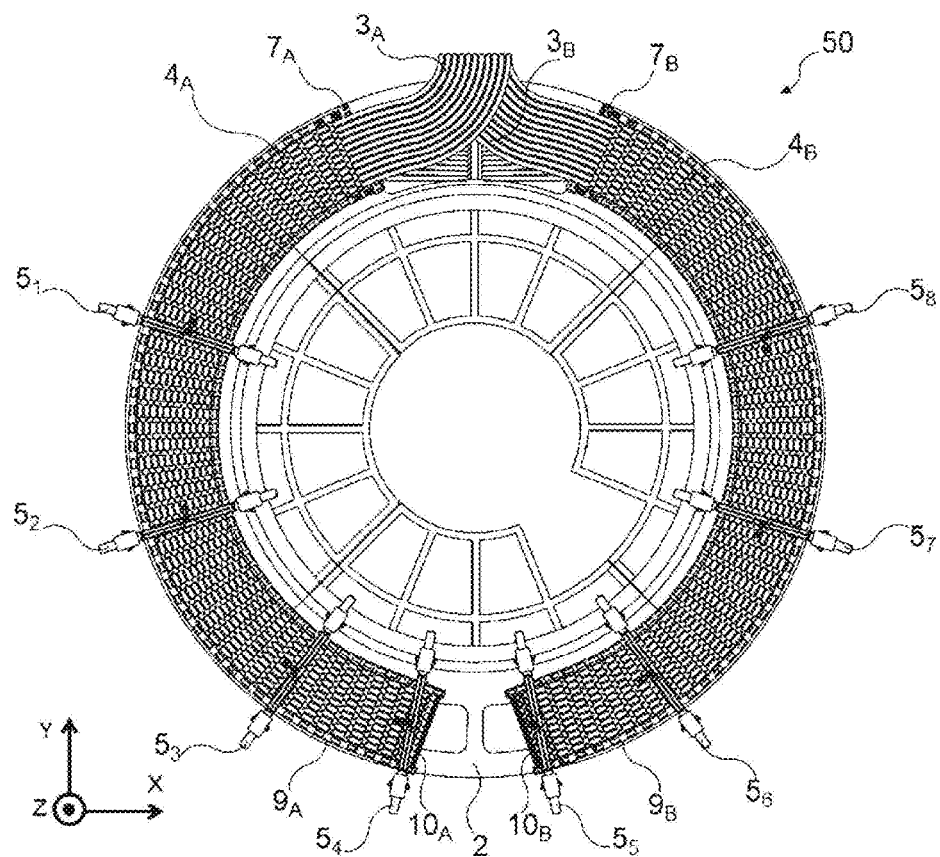
FIG. 8 is a plan view illustrating the structure of the rotational winding support apparatus according to the first embodiment, not showing the movable-side member.
Figure 9:
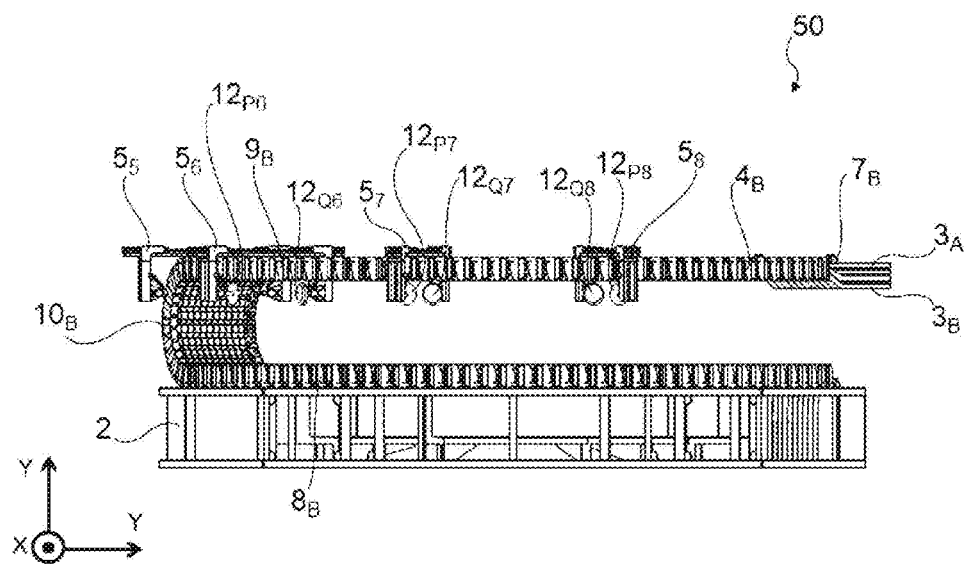
FIG. 9 is a right-side view illustrating the structure of the rotational winding support apparatus according to the first embodiment, not showing the movable-side member.
Figure 10:
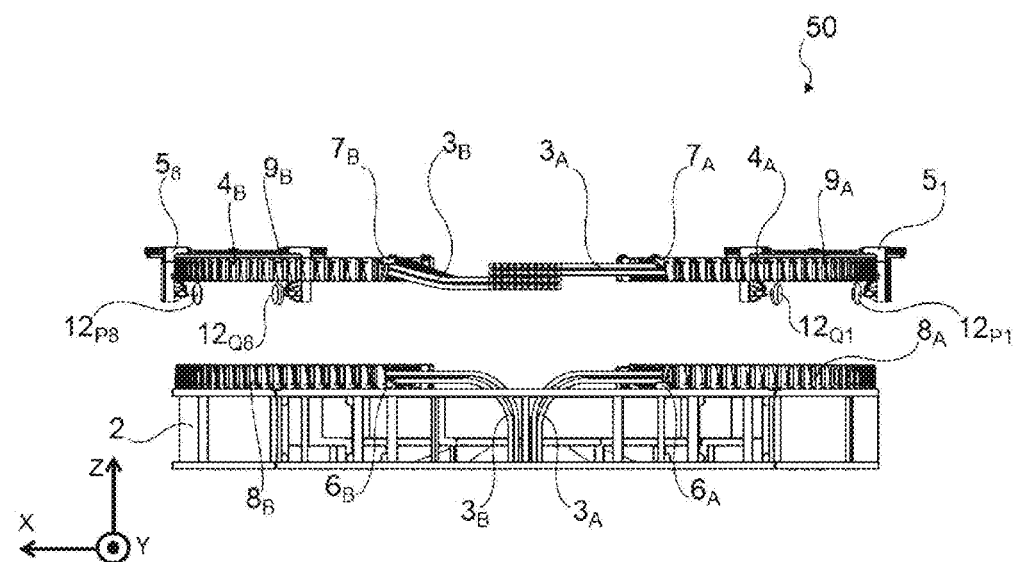
FIG. 10 is a rear view illustrating the structure of the rotational winding support apparatus according to the first embodiment, not showing the movable-side member.

Referring to FIG. 1 to FIG. 10, the structure of a rotational winding support apparatus 50 according to a first embodiment is described. FIG. 1 to FIG. 5 are a perspective view, a front view, a plan view, a right-side view, and a rear view of rotational winding support apparatus 50. FIG. 6 to FIG. 10 are a perspective view, a front view, a plan view, a right-side view, and a rear view of rotational winding support apparatus 50 not showing a movable-side member 1. For ease of visibility, in the front view, the right-side view, and the rear view of rotational winding support apparatus 50, only the objects present in front of a plane passing through the center of rotation of rotational winding support apparatus 50 are depicted.

Rotational winding support apparatus 50 mainly includes a fixed-side member 2, movable-side member 1, a plurality of tubes 3, a cable guide 4, and a plurality of guide supports 5. The cable guide is a member that protects a bundle of cables or pipes. The cable guide is formed by connecting a plurality of protective frame bodies flexibly. The protective frame bodies is described later. Rotational winding support apparatus 50 has two cable guides $4_A$ and $4_B$. Each of guide supports 5 supports cable guide $4_A$ or cable guide $4_B$ from below. Cable guide 4 may be a single. Two cable guides can protect and support more cables if the number of cables protected and supported by one cable guide is equal. When the same number of cables are protected and supported, the size of the cable guide can be reduced by using two cable guides.

Tubes 3 are pipes filled with oil for a hydraulic mechanism. A plurality of tubes 3 include a group protected by cable guide $4_A$ and a group protected by cable guide $4_B$. A group of tubes 3 protected by cable guide $4_A$ is called tubes $3_A$. A group of tubes 3 protected by cable guide $4_B$ is called tubes $3_B$.

Fixed-side member 2 is fixed to a structure. Movable-side member 1 is movable relative to fixed-side member 2. Fixed-side member 2 is shaped like a circle having a diameter of about 8 m as viewed from above. Fixed-side member 2 has a cylindrical outer shape having a small height relative to its diameter. Fixed-side member 2 has a frame structure in which frame members are connected. On the upper surface of fixed-side member 2, plate members having an opening at the center are provided to form a ring. Cable guides $4_A$ and $4_B$ are bent in the middle, and upper portions and lower portions of cable guides $4_A$ and $4_B$ extend above and below. The lower portions of cable guides $4_A$ and $4_B$ are placed on the upper surface of fixed-side member 2. The lower sides of cable guides $4_A$ and $4_B$ are present on the circular fixed-side member 2. Cable guides $4_A$ and $4_B$ are bent in an arc shape as viewed from above. On the one-end side, cable guides $4_A$ and $4_B$ are supported on fixed-side member 2 by fixed-side supporters $6_A$ and $6_B$. On the other-end side, cable guides $4_A$ and $4_B$ are supported by movable-side member 1 with movable-side supporters $7_A$ and $7_B$.

One end of each of tubes $3_A$ and $3_B$ is present below a predetermined position in the circumferential direction of fixed-side member 2. Although a connected part is not shown, one end of each of tubes $3_A$ and $3_B$ connects to fixed-side member 2. Connecting to fixed-side member 2 includes connecting not only to fixed-side member 2 but also to a member fixed to the structure. On the one-end side, tubes $3_A$ extending upward from below fixed-side member 2 enter cable guide $4_A$. Tubes $3_B$ enter cable guide $4_B$. Tubes $3_A$ and $3_B$ extending upward from below enter the inside of cable guides $4_A$ and $4_B$ bent to be horizontal. Tubes $3_A$ and $3_B$ are bent and extend in opposite directions in a substantially horizontal plane. Tubes $3_A$ and $3_B$ are arranged adjacent to each other at portions extending vertically.

Movable-side member 1 has such a shape that forms a circular space like a doughnut in its inside together with fixed-side member 2. The circular space is substantially rectangular in section. Movable-side member 1 has a cylindrical outer surface and inner surface and a circular upper surface. Movable-side member 1 has plate members attached to the frame formed by connecting the frame members.

At a predetermined position in the circumferential direction of movable-side member 1, the other end of each of tubes $3_A$ and $3_B$ is present outside of the outer surface of movable-side member 1. Although a connected part is not shown, the other end of each of tubes $3_A$ and $3_B$ connects to movable-side member 1. The other end may be connected to a member detachable from movable-side member 1. Connecting to a member movable in the same manner as movable-side member 1 includes connecting to movable-side member 1. On the other-end side, tubes $3_A$ and $3_B$ extend in the radial direction of movable-side member 1 in a horizontal plane, are bent toward the circumferential direction, and enter the inside of the respective cable guides $4_A$ and $4_B$. Tubes $3_A$ and $3_B$ extend in two directions opposite to each other in the circumferential direction of movable-side member 1 in a horizontal plane. In the inside of cable guides $4_A$ and $4_B$, tubes $3_A$ and $3_B$ are present in a horizontal plane at the same level. Tubes $3_A$ are present in a horizontal plane at the same level as the inside of cable guide $4_A$ even on the outside of cable guide $4_A$. Tubes $3_B$ at the other end are present just below tubes $3_A$. Tubes $3_B$ are bent on the outside of cable guide $4_B$, become horizontal at an upper position by the diameter of tube $3_B$, and enter the inside of cable guide $4_B$.

Movable-side member 1 is rotatable around a vertical rotation axis. Movable-side member 1 includes a drive control device 40 (shown in FIG. 16) to drive rotation of movable-side member 1. The state in which one end and the other end of each of tubes $3_A$ and $3_B$ are located above and below substantially at the same position in the circumferential direction is referred to as a reference state. The reference state is a state shown in FIG. 1 to FIG. 10. The Y axis is set at a position of fixed-side member 2 corresponding to the center of tubes $3_A$ and $3_B$ extending upward from below at the one-end side of tubes $3_A$ and $3_B$. The Y axis is the angular reference in a horizontal plane. In the vicinity of the Y axis, tubes $3_A$ and $3_B$ extend toward below fixed-side member 2. The X axis orthogonal to the Y axis in a horizontal plane is set. The Z axis is set in a direction vertical to the horizontal plane. The angle around the center of rotation of movable-side member 1 in the XY plane is 0 degrees in the positive direction of the Y axis and 90 degrees in the negative direction of the X axis.

The Y1 axis is set at a position of movable-side member 1 corresponding to the center of tubes $3_A$ and $3_B$ overlapped vertically on the other-end side. The X1 axis orthogonal to the Y1 axis in a horizontal plane is set. The X1 axis and the Y1 axis rotate together with movable-side member 1. The state in which the Y1 axis and the Y axis coincide is the reference state. In the reference state, the rotation angle θ of movable-side member 1 is 0 degrees. The rotation angle θ is positive when movable-side member 1 rotates counterclockwise. Movable-side member 1 is rotatable in the range of rotation angles θ, for example, from +225 degrees to −225 degrees.

Fixed-side supporters $6_A$ and $6_B$ are provided symmetrically with respect to the Y axis in the vicinity of the Y axis. Movable-side supporters $7_A$ and $7_B$ are provided symmetrically with respect to the Y1 axis in the vicinity of the Y1 axis.

A plurality of tubes $3_A$ and $3_B$ are flexible. A plurality of tubes $3_A$ are bundled without twist nor tangle and protected by cable guide $4_A$. A plurality of tubes $3_B$ are bundled without twist nor tangle and protected by cable guide $4_B$.

Cable guides $4_A$ and $4_B$ have the same structure. The structure of cable guide $4_A$ is described. Cable guide $4_A$ is a structure in which protective frame bodies that are frames having a plurality of holes to allow a plurality of tubes $3_A$ to pass through are connected. Each of the protective frame bodies has, for example, 11 holes in the radial direction of fixed-side member 2 and for example, two rows of holes in the height direction. The protective frame body has a length defined in the direction in which tubes $3_A$ extend (extending direction). A member surrounding each of a plurality of holes can be considered as a single frame. A member having a plurality of holes as a whole may be considered as a single frame. A plurality of protective frame bodies are coupled in such a manner that the connection angle is changeable in the extending direction to form cable guide $4_A$. Cable guide $4_A$ is flexible. Cable guide $4_A$ protects tubes $3_A$ such that external force is not exerted on tubes $3_A$. Each of tubes $3_A$ enters any one of holes of cable guide $4_A$ without being twisted. The number of tubes $3_A$ entering one hole is limited to a few, so that cable guide $4_A$ prevents tangle of tubes $3_A$.

Cable guide $4_A$ has a lower guide $8_A$, an upper guide $9_A$, and a bending portion $10_A$. Lower guide $8_A$ is placed on fixed-side member 2. Upper guide $9_A$ is present above lower guide $8_A$. Upper guide $9_A$ is supported by guide supports 5. Bending portion $10_A$ is a bending portion of the turned back cable guide $4_A$. Bending portion $10_A$ is present between lower guide $8_A$ and upper guide $9_A$. Bending portion $10_A$ is a portion at which cable guide $4_A$ is bent in the middle. At bending portion $10_A$, the protective frame bodies are connected while being bent. As viewed from the side, bending portion $10_A$ has an arc shape. Because of the presence of bending portion $10_A$, lower guide $8_A$ and upper guide $9_A$ are located above and below. The direction in which lower guide $8_A$ extends and the direction in which upper guide $9_A$ extends are opposite directions.

Cable guide $4_B$ has a lower guide $8_B$, an upper guide $9_B$, and a bending portion $10_B$ in the same manner as cable guide $4_A$.

Cable guides $4_A$ and $4_B$ are arranged such that bending portions $10_A$ and $10_B$ are adjacent to each other. As is described later, when movable-side member 1 rotates, bending portions $10_A$ and $10_B$ move. Bending portions $10_A$ and $10_B$ are moved in the circumferential direction relative to fixed-side member 2 and movable-side member 1. Bending portions $10_A$ and $10_B$ are moved such that the distance therebetween is substantially constant.

Cable guides $4_A$ and $4_B$ are protective frame connected bodies for holding respective tubes $3_A$ and $3_B$ flexibly, in which a plurality of protective frame bodies are connected flexibly in the extending direction. Tubes $3_A$ and $3_B$ are protection targets such as cable or pipes protected by cable guides $4_A$ and $4_B$, respectively. Lower guides $8_A$ and $8_B$ are lower sides of cable guides $4_A$ and $4_B$ overlapped vertically. Fixed-side member 2 is a lower supporter that supports lower guides $8_A$ and $8_B$. Upper guides $9_A$ and $9_B$ are upper sides of cable guides $4_A$ and $4_B$ overlapped vertically.

Guide supports 5 support the upper sides of cable guides $4_A$ and $4_B$ from below. Guide supports 5 are fixed to the upper surface of movable-side member 1. Guide supports 5 are provided to extend toward the center of rotation of movable-side member 1. As viewed from above, guide supports 5 are provided to intersect cable guides $4_A$ and $4_B$ in the arc shape.

Since movable-side member 1 is large with a diameter of about 8 m, cable guides $4_A$ and $4_B$ are also large and heavy. Guide supports 5 being moved together with movable-side member 1 are provided to support cable guides $4_A$ and $4_B$ at about 2 m intervals. Rotational winding support apparatus 50 includes eight guide supports 5. The number of guide supports 5 is determined as appropriate depending on the size of the rotational winding support apparatus and the size and weight of the cable guides.

In the X1Y1 coordinates that are moved together with movable-side member 1, movable-side supporters $7_A$ and $7_B$ are present at symmetric positions on both sides of the Y1 axis. The rotation angle θ of movable-side member 1 is the angle between the Y1 axis moving together with movable-side member 1 and the fixed Y axis.

Eight guide supports 5 are denoted by guide supports $5_1$, $5_2$, $5_3$, $5_4$, $5_5$, $5_6$, $5_7$, and $5_8$ in increasing order of the angle to the Y1 axis. The position of movable-side supporters $7_A$ and $7_B$ and guide support Si(j=1, 2, . . . , 8) is represented as follows by the angle between the Y1 axis and a half line connecting the center of rotation of movable-side member 1 to guide support 5.

Movable-side supporter $7_A$=23 degrees
Guide support $5_1$=72 degrees
Guide support $5_2$=108 degrees
Guide support $5_3$=144 degrees
Guide support $5_4$=168 degrees
Guide support $5_5$=192 degrees
Guide support $5_6$=216 degrees
Guide support $5_7$=252 degrees
Guide support $5_8$=288 degrees
Movable-side supporter $7_B$=337 degrees The spacing between adjacent guide supports 5 is as follows.

Between movable-side supporter $7_A$ and guide support $5_1$=about 49 degrees
Between guide supports $5_1$, and $5_2$=36 degrees
Between guide supports $5_2$ and $5_3$=36 degrees
Between guide supports $5_3$ and $5_4$=24 degrees
Between guide supports $5_4$ and $5_5$=24 degrees
Between guide supports $5_5$ and $5_6$=24 degrees
Between guide supports $5_6$ and $5_7$=36 degrees
Between guide supports $5_7$ and $5_8$=36 degrees
Between guide support $5_8$ and movable-side supporter $7_B$=about 49 degrees The spacing between movable-side supporter $7_A$ and guide support $5_1$ and the spacing between guide support $5_8$ and movable-side supporter $7_B$ are about 49 degrees, wider than the other places. Movable-side supporters $7_A$ and $7_B$ support the end portions of cable guides $4_A$ and $4_B$ securely such that cable guides $4_A$ and $4_B$ extend in the horizontal direction. Therefore, the wider spacing between either movable-side supporters $7_A$ or $7_B$ and guide support 5 than those at the other places does not cause any difficulty in supporting cable guides $4_A$ and $4_B$.

At a position at the angle of 180 degrees in movable-side member 1, a not-shown member is present. At the position at the angle of 180 degrees, it should be avoided to provide guide support 5. Thus, guide supports $5_4$ and $5_5$ are provided at the positions sandwiching the position at the angle of 180 degrees, and, in total, eight guide supports 5 are provided. In the reference state, guide supports $5_1$, $5_2$, and $5_3$ support cable guide $4_A$, and guide support $5_6$, $5_7$, and $5_8$ support cable guide $4_B$.

Figure 11:
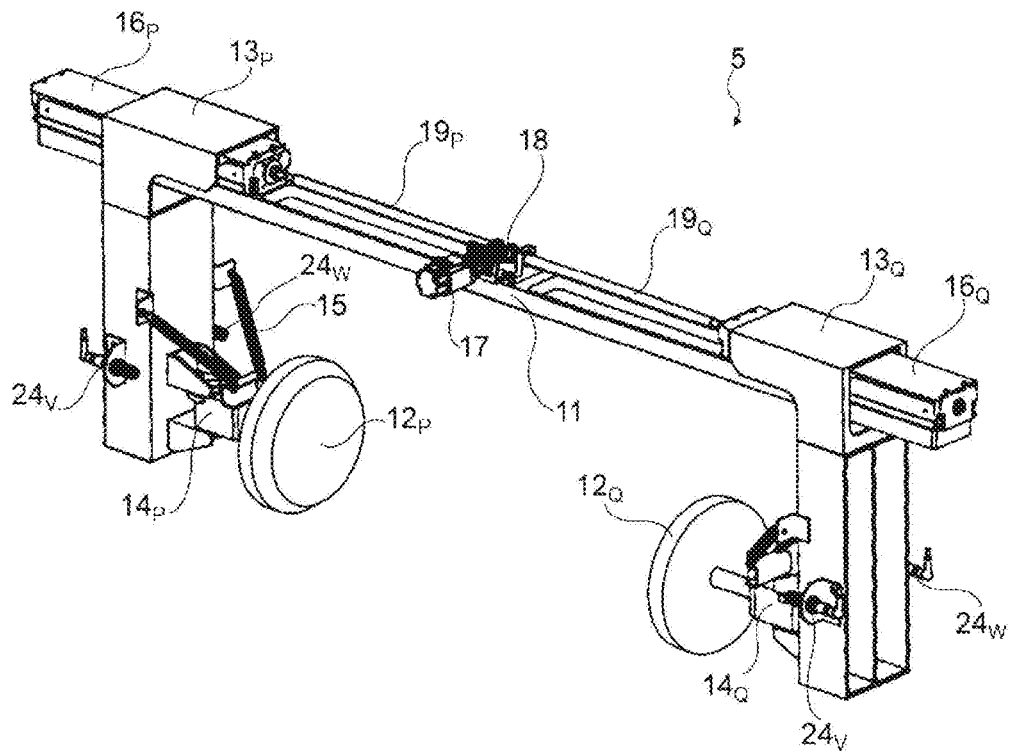
FIG. 11 is a perspective view illustrating the structure of a guide support of the rotational winding support apparatus according to the first embodiment.
Figure 12:
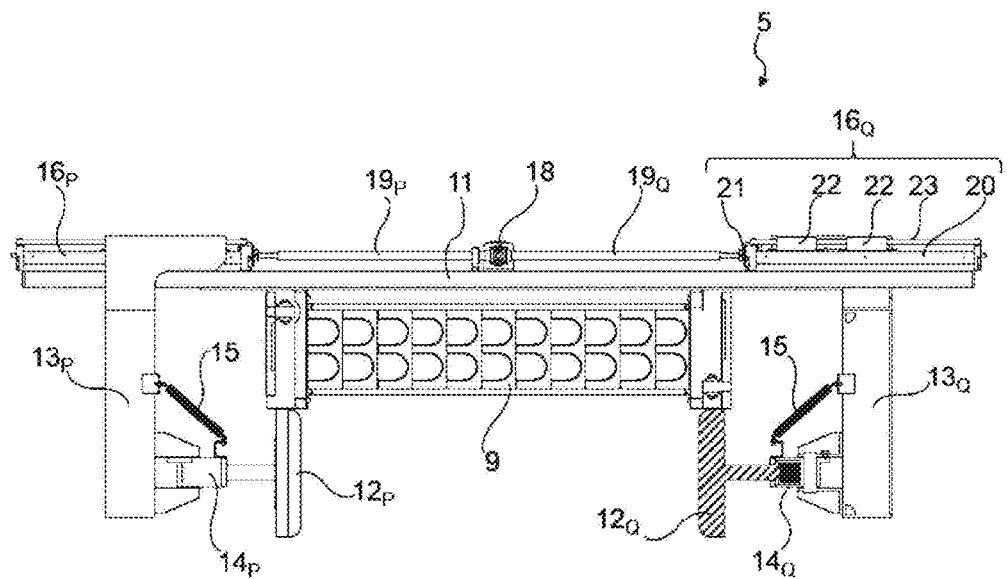
FIG. 12 is a front view in a state in which the guide support of the rotational winding support apparatus according to the first embodiment supports a cable guide.
Figure 13:
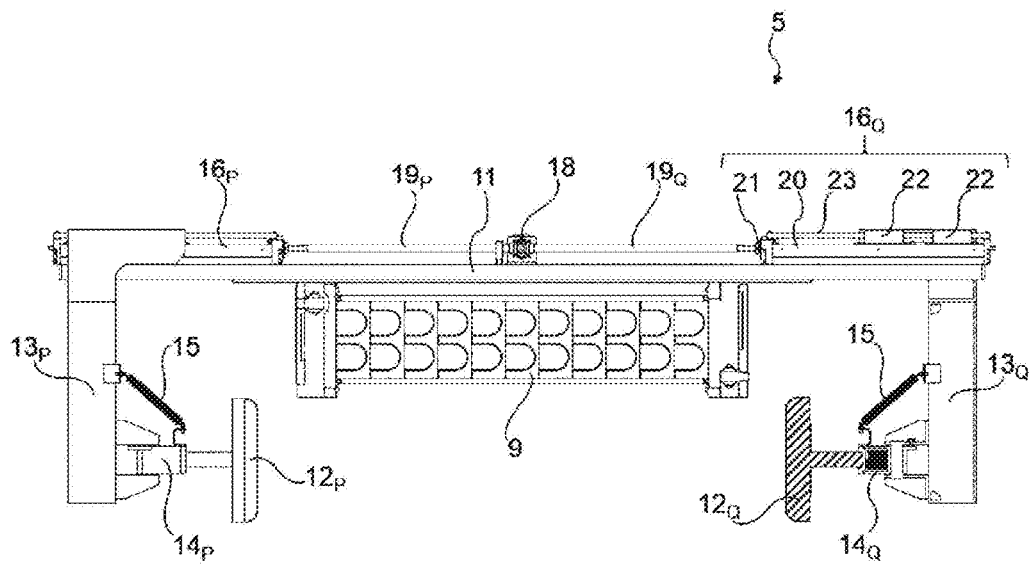
FIG. 13 is a front view in a state in which the guide support of the rotational winding support apparatus according to the first embodiment is opened.
Figure 14:
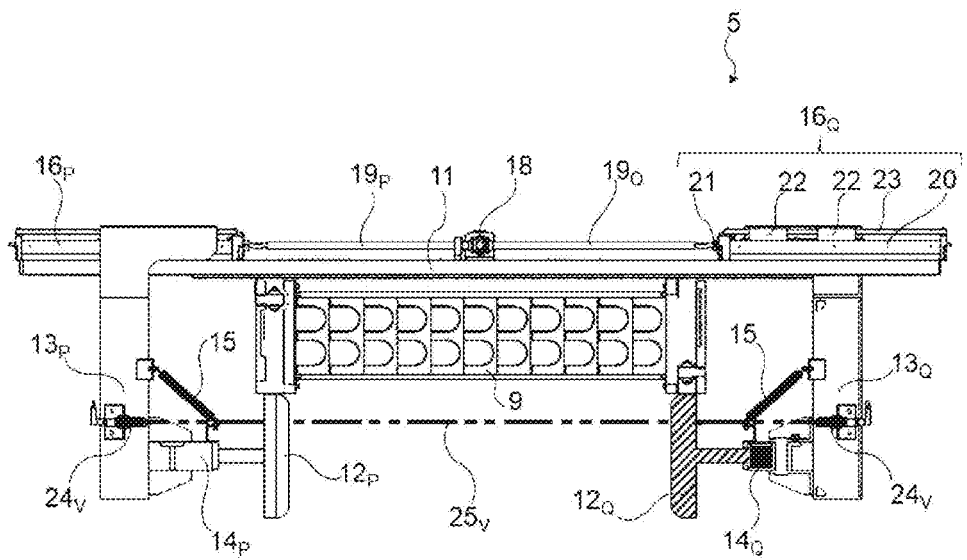
FIG. 14 is a front view illustrating a light ray emitted by optical sensor in a state in which the guide support of the rotational winding support apparatus according to the first embodiment supports the cable guide.
Figure 15:
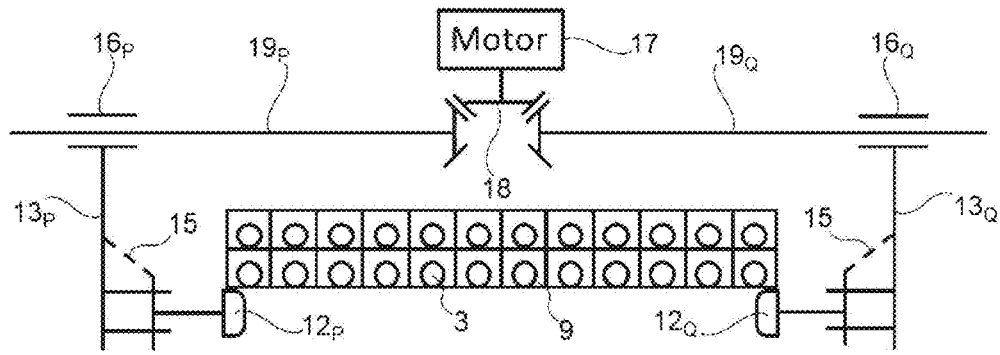
FIG. 15 is a diagram illustrating a drive mechanism for the guide support of the rotational winding support apparatus according to the first embodiment.
Figure 15:
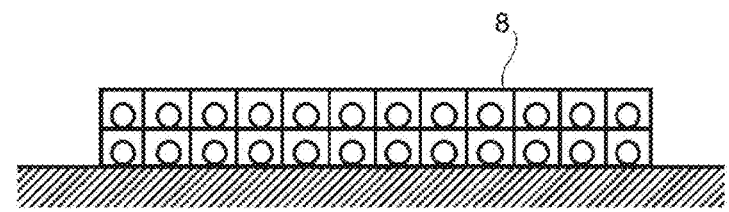

Referring to FIG. 11 to FIG. 15, the structure of guide support 5 is described. FIG. 11 is a perspective view of guide support 5. FIG. 12 is a front view in a state in which guide support 5 supports cable guide 4. FIG. 13 is a front view in a state in which guide support 5 is open. FIG. 14 is a front view illustrating a light ray emitted by optical sensor in a state in which guide support 5 supports cable guide 4. FIG. 15 is a diagram illustrating a drive mechanism for guide support 5. The front of guide support 5 is the side facing in the moving direction when movable-side member 1 moves rotationally counterclockwise.

Guide support 5 mainly includes a base frame 11, support rollers 12, movable frames 13, roller connecting portions 14, support springs 15, linear motor (LM) guide actuators 16, a motor 17, a gear 18, and shafts 19. Base frame 11 is a frame extending horizontally and orthogonally to cable guide 4. Base frame 11 is fixed to movable-side member 1. Support rollers 12 are members in contact with cable guide 4 and supporting cable guide 4. One guide support 5 includes two support rollers 12, two movable frames 13, two LM guide actuators 16, and two shafts 19. Support roller 12 present on the outer peripheral side of cable guide 4 is denoted as support roller $12_P$, and support roller 12 present on the inner peripheral side thereof is denoted as support roller $12_Q$. Support rollers 12 of guide support $5_j$ are denoted as support rollers $12_{Pj}$ and $12_{Qj}$. When there are two members for one guide support 5, such as LM guide actuators 16, they are denoted similarly. In FIG. 12 to FIG. 14, support roller $12_Q$, movable frame $13_Q$, and LM guide actuator $16_Q$ on the right side in the drawings are illustrated in a state whose surfaces are removed. For one support roller 12, one movable frame 13, one roller connecting portion 14, one LM guide actuator 16, and two support springs 15 are provided.

Support roller 12 includes a disk-shaped portion and a cylindrical shaft. The disk-shaped portion of support roller 12 supports cable guide 4 (upper guide 9) on its side surface. The shaft of support roller 12 is connected to the disk-shaped portion at the center of the circle and extends vertically to the disk-shaped portion. About a half of the thickness of the disk-shaped portion on the side connected to the shaft is shaped like a cylinder. This cylinder has a small height compared to its radius. Another half on the farther side from the shaft has an end surface having a diameter slightly smaller than the cylindrical portion and a side surface smoothly connected to the end surface. When viewed from the side, the disk-shaped portion has such a shape that the upper and lower corners on one side of a vertically long rectangle are replaced by arcs. The corners replaced by arcs of the rectangle are the corners on the farther side from the side connected to the shaft.

When support roller 12 starts being in contact with upper guide 9, support roller 12 rotates and friction is small. Since support roller 12 has a disk-like shape having an end surface with a small diameter on the farther side from the shaft (the side closer to upper guide 9), support roller 12 can smoothly enters below upper guide 9 with a small friction when moving and starting to support upper guide 9. After the position where support roller 12 supports upper guide 9 is determined, movable-side member 1, support roller 12, and upper guide 9 rotate with the relative positional relation therebetween being fixed. Therefore, while movable-side member 1 rotating, the place where support roller 12 supports upper guide 9 does not move, and support roller 12 does not roll relative to upper guide 9. Rolling friction is not generated between support roller 12 and upper guide 9.

Movable frame 13 is a member to which support roller 12 is connected rotatably and which moves along base frame 11. Movable frame 13 is mainly present under base frame 11. The portion of movable frame 13 that is below base frame 11 has a quadrangular prism-like outer shape. Movable frame 13 also extends above base frame 11 with base frame 11 interposed. Movable frame 13 is driven by LM guide actuator 16 to move.

Roller connecting portion 14 is a member that connects support roller 12 to movable frame 13 rotatably. One end of roller connecting portion 14 is connected to the shaft of support roller 12. The shaft of support roller 12 is held rotatably by roller connecting portion 14. Roller connecting portion 14 is connected to movable frame 13 such that the connection angle between support roller 12 and movable frame 13 is changeable. A spring that pushes the shaft of support roller 12 outward is present in the inside of roller connecting portion 14. Therefore, when force is exerted to push support roller 12 in a direction toward roller connecting portion 14, the shaft of support roller 12 is moved to enter the inside of roller connecting portion 14. When the force pushing support roller 12 is not applied, the shaft of support roller 12 is put back to the original position by the spring.

The other end of roller connecting portion 14 is connected to movable frame 13 rotatably in a horizontal plane. Specifically, a rotation shaft provided in movable frame 13 passes through the other end of roller connecting portion 14 in the upper-lower direction. Support spring 15 is provided between roller connecting portion 14 and movable frame 13. One end of support spring 15 is connected to roller connecting portion 14. The other end of support spring 15 is connected to movable frame 13 at a position to the right/left of and above support roller 12. In a situation in which support roller 12 is in contact with bending portion 10, support roller 12 can be moved. Since support roller 12 is moved, cable guide 4 at support roller 12 and bending portion 10 is not broken even if bending portion 10 comes into contact with support roller 12. When the situation in which support roller 12 is in contact with bending portion 10 is ended, support spring 15 puts roller connecting portion 14 and support roller 12 back to the normal position.

LM guide actuator 16 is a member that moves movable frame 13 along base frame 11. LM guide actuator 16 is provided for each movable frame 13. LM guide actuator 16 is provided such that movable frame 13 can be moved in a predetermined range from both ends of base frame 11. The predetermined range is a range including a position where support roller 12 supports cable guide 4 and a position where support roller 12 is located outside cable guide 4. The outside of cable guide 4 means the outside of a space below the upper side of cable guide 4 side (upper guide 9).

LM guide actuators 16 are provided on the upper side of the portions close to both ends of base frame 11. LM guide actuator 16 includes a body 20, a screw rod 21, movable portions 22, and a guide plate portion 23. Body 20 is shaped like a box. Body 20 accommodates screw rod 21 and a lower portion of movable portion 22. Body 20 is fixed to base frame 11. Guide plate portion 23 is fixed to body 20 at both ends on the upper side of body 20. Screw rod 21 is a cylindrical rod having a male screw on the outer surface. Screw rod 21 is held rotatably by body 20. One end of screw rod 21 is connected to shaft 19 outside of body 20. Screw rod 21 is provided such that the rotation of shaft 19 is transmitted to rotate screw rod 21.

In LM guide actuator 16, two movable portions 22 are provided with a predetermined spacing. Movable portion 22 has a portion exposed outside of body 20 from an opening in the upper surface of body 20. Outside of body 20, movable frame 13 is fixed to two movable portions 22. Movable portion 22 has a screw hole and a guide hole. The screw hole has a female screw in its inner surface to be fitted to the male screw of screw rod 21. Screw rod 21 passes through the screw hole. Guide plate portion 23 passes through the guide hole. Movable portion 22 is unable to rotate because screw rod 21 and guide plate portion 23 penetrate therethrough. When screw rod 21 rotates, movable portion 22 is moved along screw rod 21. LM guide actuator 16 converts the rotation of screw rod 21 into linear movement of movable portion 22 and movable frame 13.

Motor 17 rotates shaft 19 to generate motive power that moves movable frame 13. Motor 17 is present in a horizontal plane and provided vertically to the side surface of base frame 11. The direction of the rotation shaft of motor 17 and the direction in which shaft 19 extend are orthogonal to each other. One motor 17 is provided at the center of base frame 11. Gear 18 converts the rotation of motor 17 into rotation of two shafts 19. Gear wheels having teeth formed obliquely are meshed in gear 18. Gear 18 transmits the rotation of motor 17 to shafts 19 provide to be orthogonal to motor 17. Motor 17 and gear 18 are sandwiched by two shafts 19, which extend toward both ends of base frame 11. Each shaft 19 connects to screw rod 21 of LM guide actuator 16. Therefore, rotation of one motor 17 enables two movable frames 13 to be moved by the same amount.

Optical sensors 24 are provided on the front side and the rear side of guide support 5. The front side of guide support 5 is the side that is present in front of the movable-side member 1 when movable-side member 1 rotates counterclockwise. Optical sensor 24 has an emission portion that emits a light ray 25 at one of two movable frames 13 and a light-receiving portion that receives light ray 25 at the other of the two movable frame 13. Light ray 25 may be visible light or may be infrared light. Light ray 25 may be laser light or may be other kinds of light. Optical sensor 24 on the front side of guide support 5 is called optical sensor $24_V$, and optical sensor 24 on the rear side is called optical sensor $24_W$. Similarly, light ray 25 on the front side is called light ray $25_V$, and light ray 25 on the rear side is called light ray $25_W$.

Optical sensor 24 is provided horizontally at a position slightly higher than the shaft of support roller 12. Optical sensor 24 emits and receives light ray 25 to detect whether or not an object is present at a position where light ray 25 passes through. Light ray $25_V$ emitted by optical sensor $24_V$ is depicted by a dashed-two dotted line in FIG. 14. When the light-receiving portion is able to receive light ray 25, optical sensor 24 detects that no object exists. When the light-receiving portion is unable to receive light ray 25, optical sensor 24 detects that an object exists. Information detected by optical sensor 24 as to whether or not an object exists on an optical path of light ray 25 is called object detection information.

Optical sensors 24 are provided to detect that guide support 5 is close to bending portion 10 of cable guide 4. When one of optical sensors $24_V$ and $24_W$ begins detecting an object in a state in which neither optical sensor $24_V$ nor $24_W$ detects an object, guide support 5 is close to bending portion 10. When optical sensor 24 detecting an object stops detecting the object and neither optical sensor $24_V$ nor $24_W$ detects an object, guide support 5 is present at a distance from the vicinity of bending portion 10. The position of movable frames 13 is changed depending on whether or not optical sensors 24 detect bending portion 10 (object). Accordingly, support rollers 12 are prevented from being in contact with bending portion 10.

Light ray 25 is emitted and received at a predetermined position relative to guide support 5. Therefore, optical sensor 24 detects an object present at a predetermined position relative to guide support 5. That is, optical sensor 24 is detection sensor that detects bending portion 10 present at a predetermined position relative to guide support 5. The position irradiated with light ray 25 relative to guide support 5 is determined at a position where movable frames 13 can be moved to an open position before being in contact with bending portion 10, in consideration of the rotation speed of movable-side member 1 and the speed at which movable frames 13 of guide support 5 move. The object detection information is information indicating whether or not bending portion 10 is present at a predetermined position relative to guide support 5.

Figure 16:
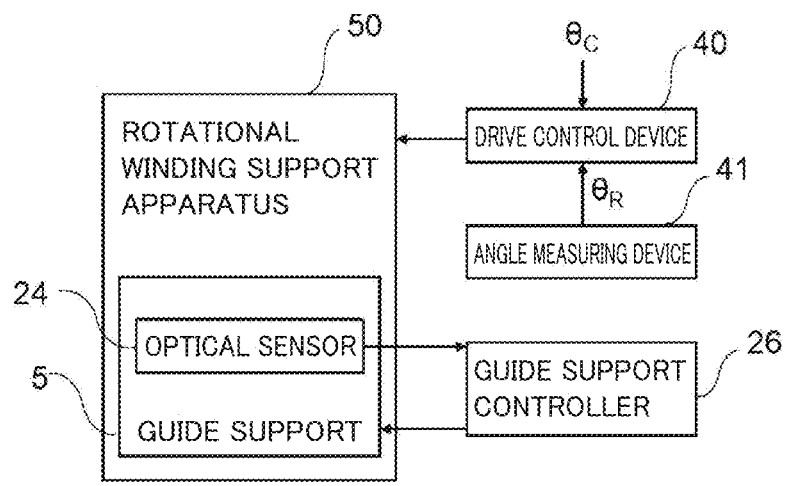
FIG. 16 is a block diagram illustrating a configuration of a control device that controls the rotational winding support apparatus according to the first embodiment.

Referring to FIG. 16, the configuration of a control device that controls rotational winding support apparatus 50 is described. In rotational winding support apparatus 50, drive control device 40 controls the rotation angle θ of movable-side member 1. An angle command value $θ_C$ and an angle measurement value $θ_R$ are inputted to drive control device 40. The angle command value $θ_C$ is inputted from the outside of drive control device 40. The angle measurement value $θ_R$ is measured by an angle measuring device 41. Drive control device 40 controls rotational winding support apparatus 50 such that the angle measurement value $θ_R$ matches the angle command value $θ_C$. Angle measuring device 41 is a rotation angle acquirer that acquires the rotation angle of the movable-side member.

The object detection information detected by optical sensors $24_V$ and $24_W$ installed at guide support $5_j$ (j=1, 2, . . . , 8) is inputted to a guide support controller 26. A position in guide support $5_j$ where support rollers $12_{Pj}$ and $12_{Qj}$ support cable guide 4 is referred to as support position. A position where support rollers $12_{Pj}$ and $12_{Qj}$ do not support cable guide 4 and are never in contact with bending portion 10 is referred to as open position. Guide support controller 26 controls the support rollers $12_{Pj}$ and $12_{Qj}$ of guide support $5_j$ to be in either support position or the open position, in accordance with the object detection information indicating whether or not light rays $25_V$ and $25_W$ are received.

Figure 17:
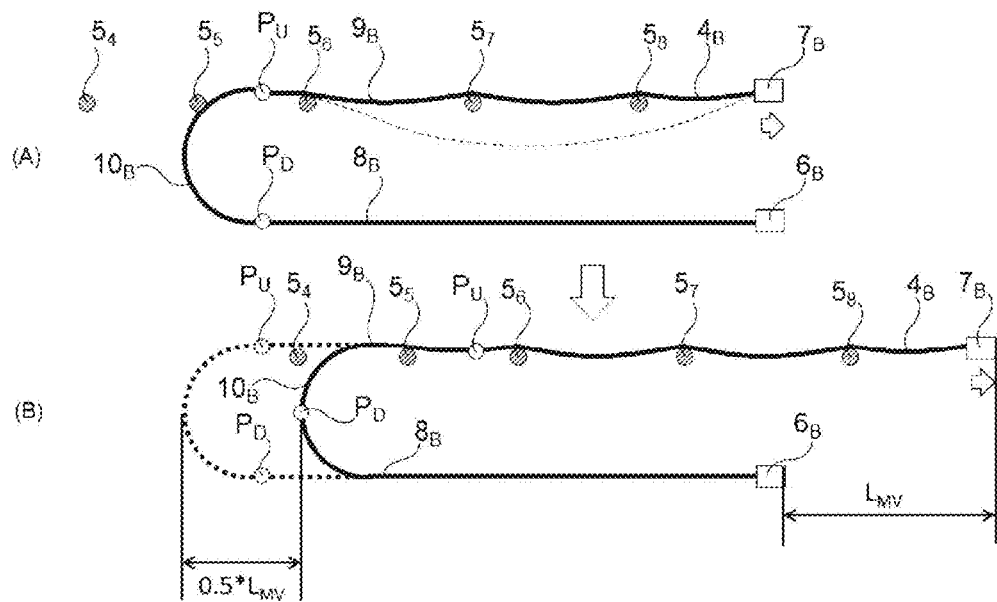
FIG. 17 is a diagram illustrating a state in which the cable guide is moved when the rotational winding support apparatus according to the first embodiment rotates counterclockwise.
Figure 18:
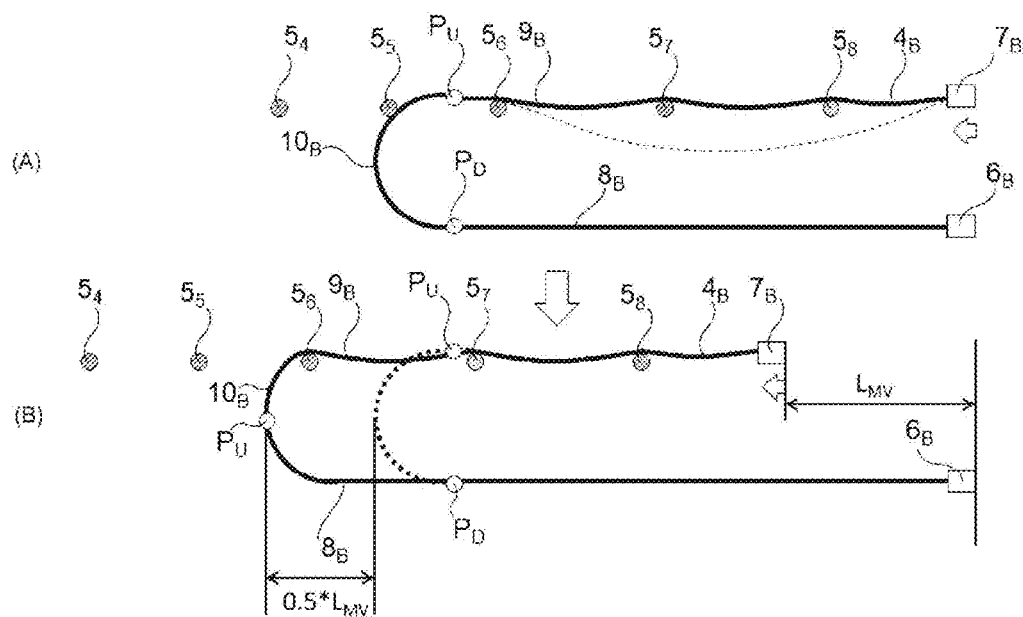
FIG. 18 is a diagram illustrating a state in which the cable guide is moved when the rotational winding support apparatus according to the first embodiment rotates clockwise.
Figure 19:
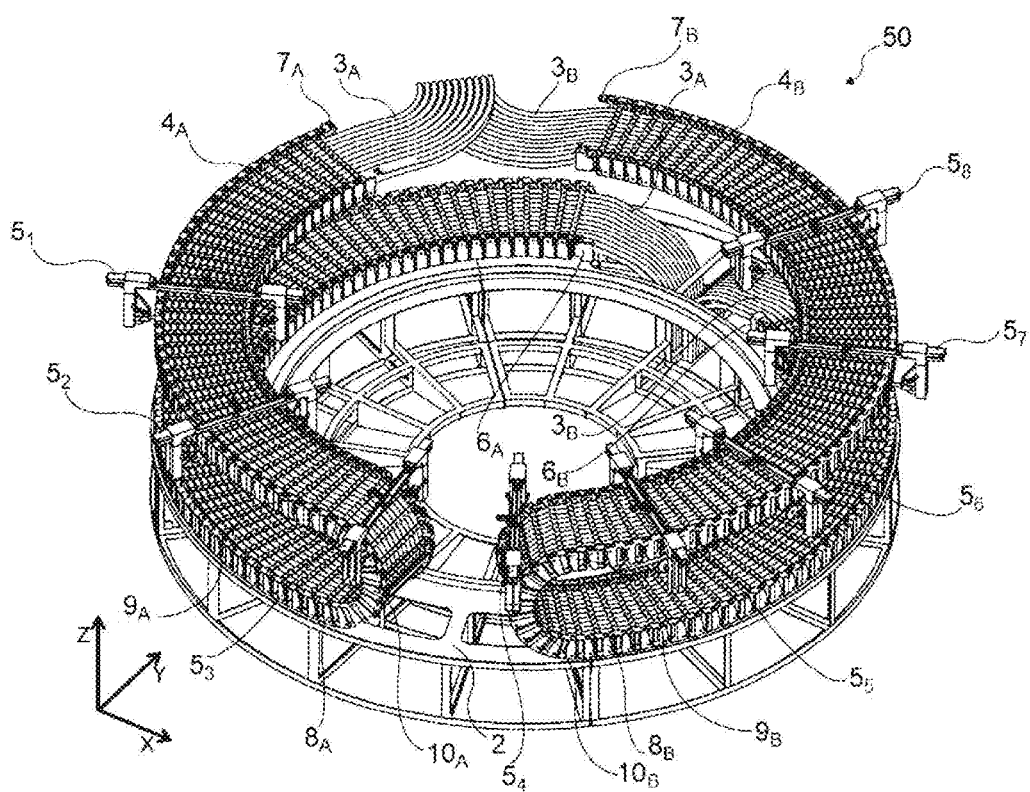
FIG. 19 is a perspective view illustrating the structure of the rotational winding support apparatus according to the first embodiment rotated by 45 degrees, not showing the movable-side member.
Figure 20:
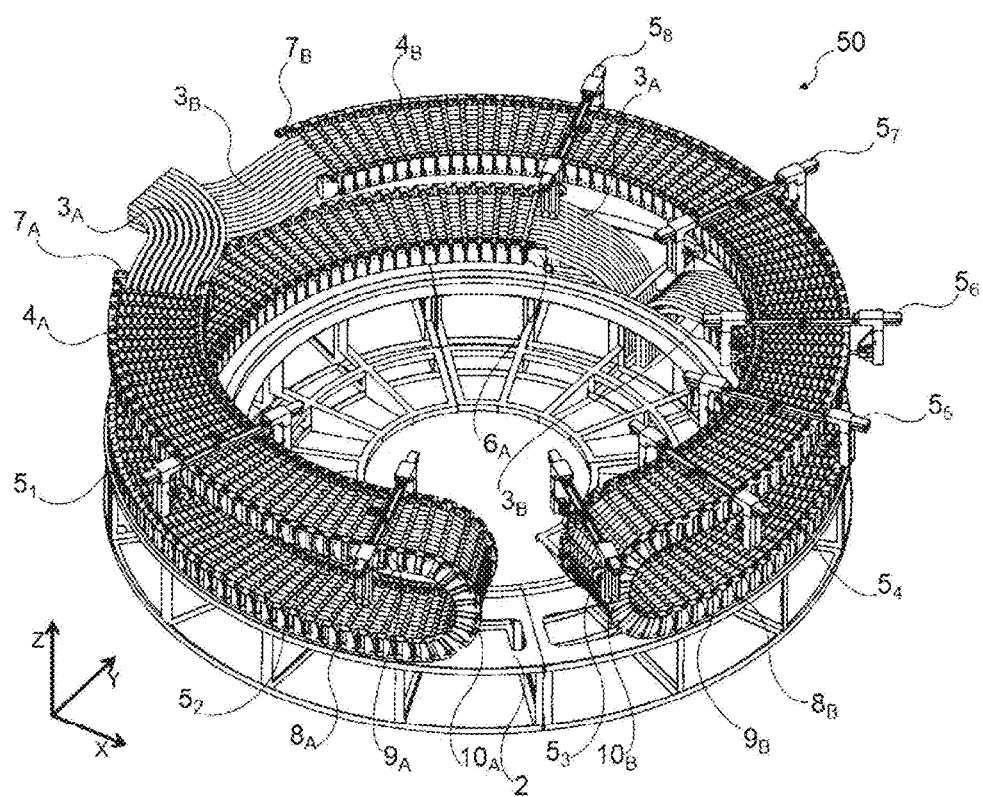
FIG. 20 is a perspective view illustrating the structure of the rotational winding support apparatus according to the first embodiment rotated by 90 degrees, not showing the movable-side member.
Figure 21:
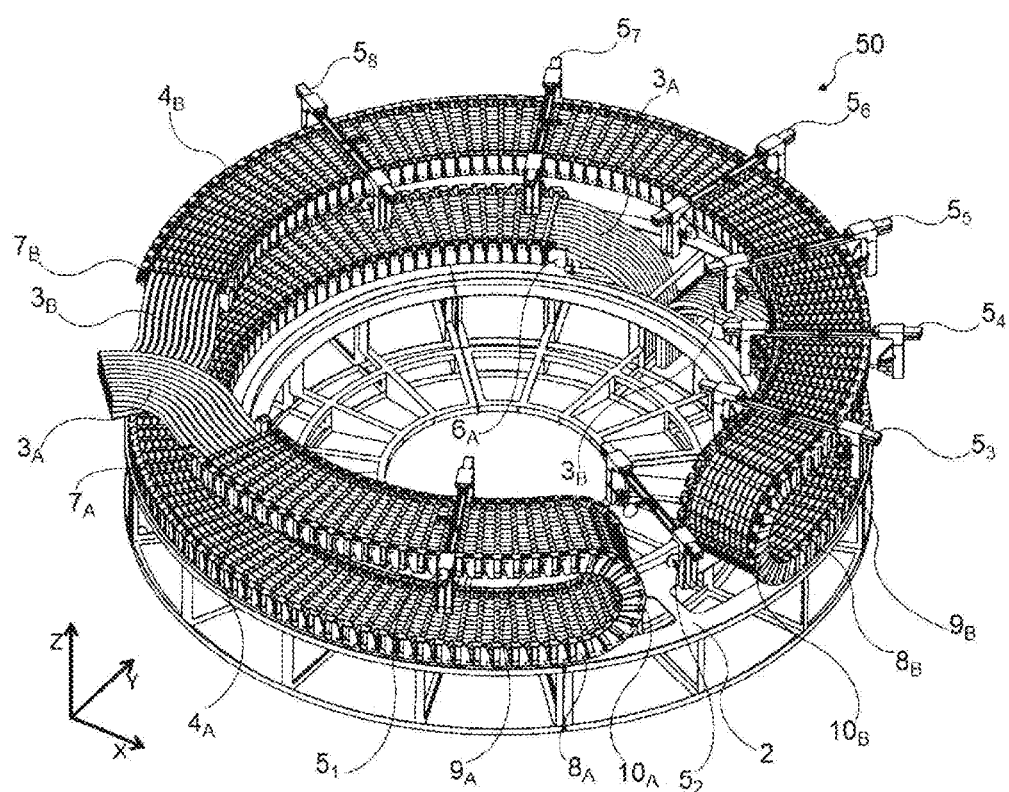
FIG. 21 is a perspective view illustrating the structure of the rotational winding support apparatus according to the first embodiment rotated by 135 degrees, not showing the movable-side member.
Figure 22:
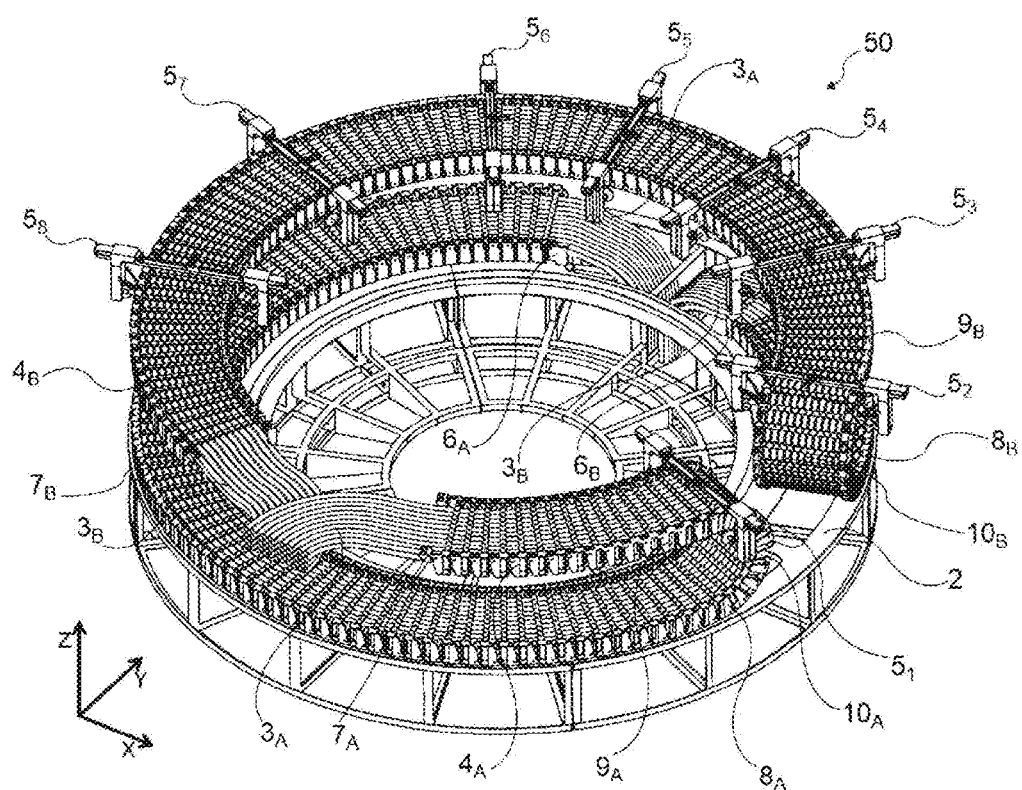
FIG. 22 is a perspective view illustrating the structure of the rotational winding support apparatus according to the first embodiment rotated by 180 degrees, not showing a movable-side member.
Figure 23:
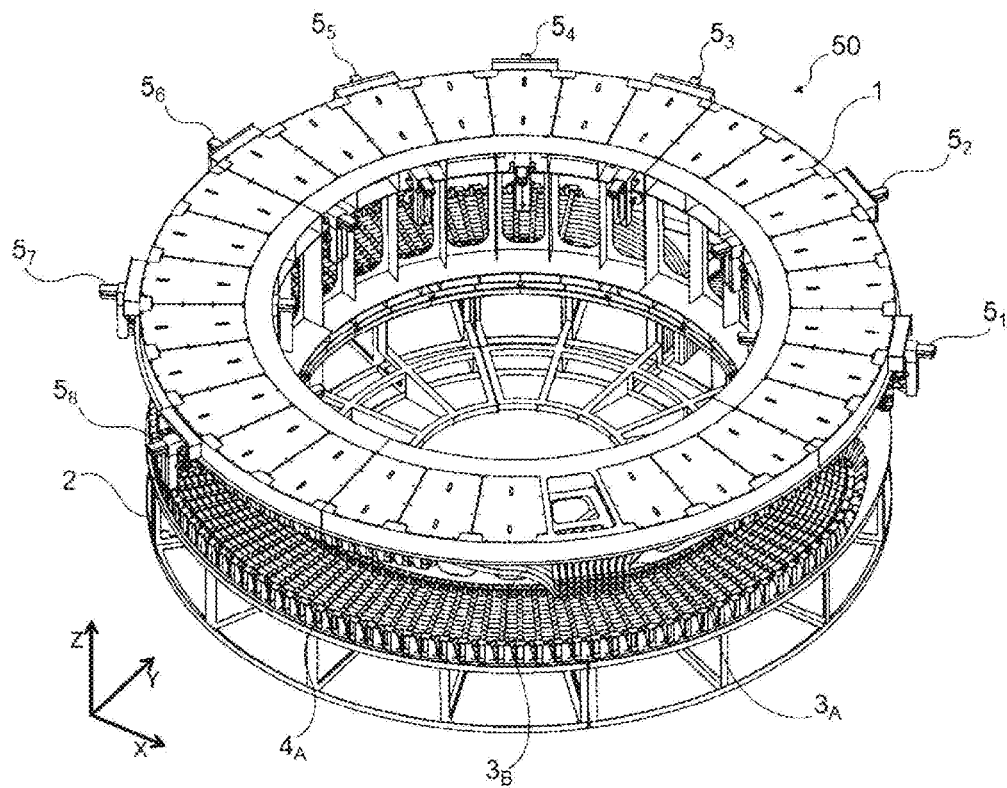
FIG. 23 is a perspective view illustrating the structure of the rotational winding support apparatus according to the first embodiment rotated by 225 degrees.
Figure 24:
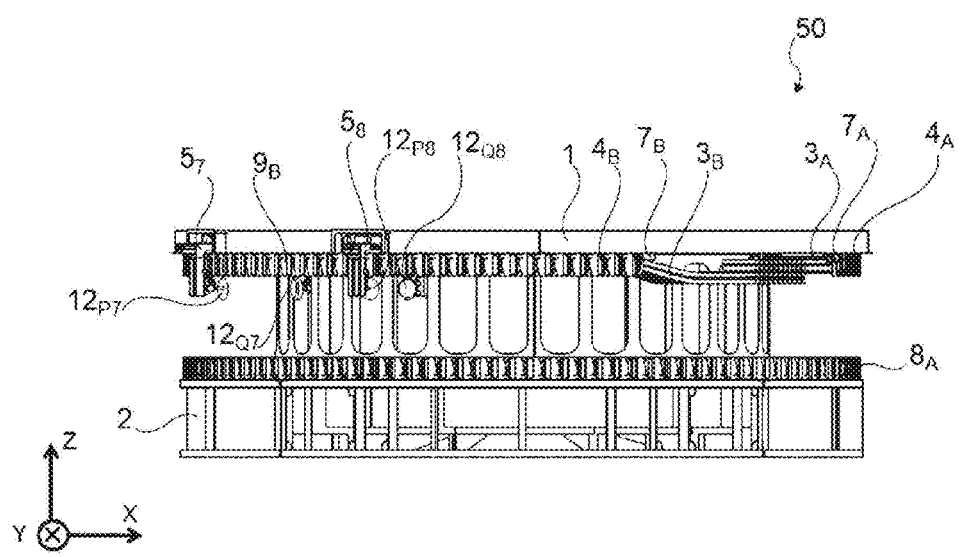
FIG. 24 is a front view illustrating the structure of the rotational winding support apparatus according to the first embodiment rotated by 225 degrees.
Figure 25:
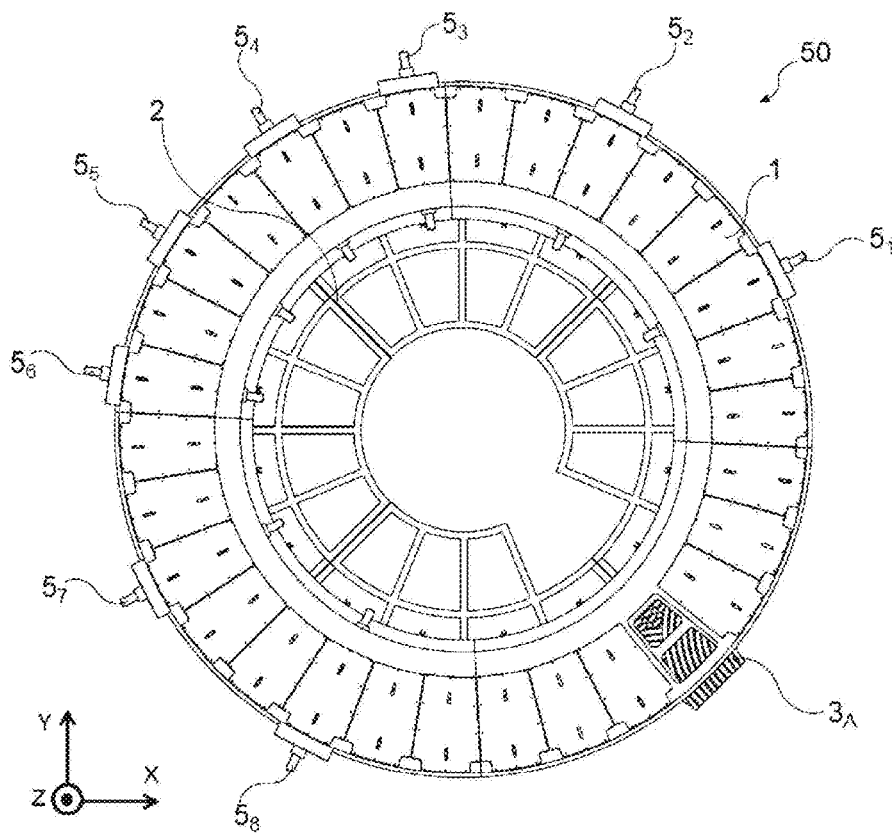
FIG. 25 is a plan view illustrating the structure of the rotational winding support apparatus according to the first embodiment rotated by 225 degrees.
Figure 26:
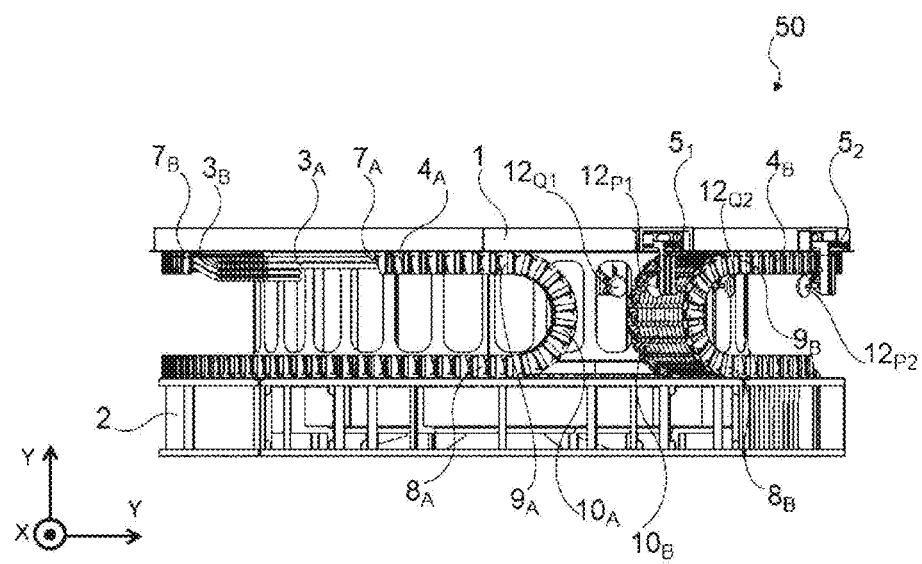
FIG. 26 is a right-side view illustrating the structure of the rotational winding support apparatus according to the first embodiment rotated by 225 degrees.
Figure 27:
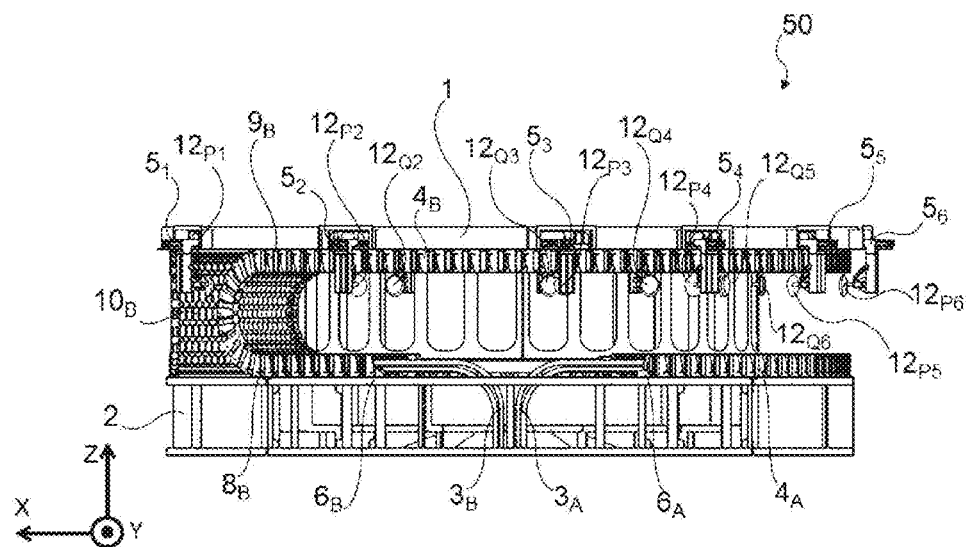
FIG. 27 is a rear view illustrating the structure of the rotational winding support apparatus according to the first embodiment rotated by 225 degrees.
Figure 28:
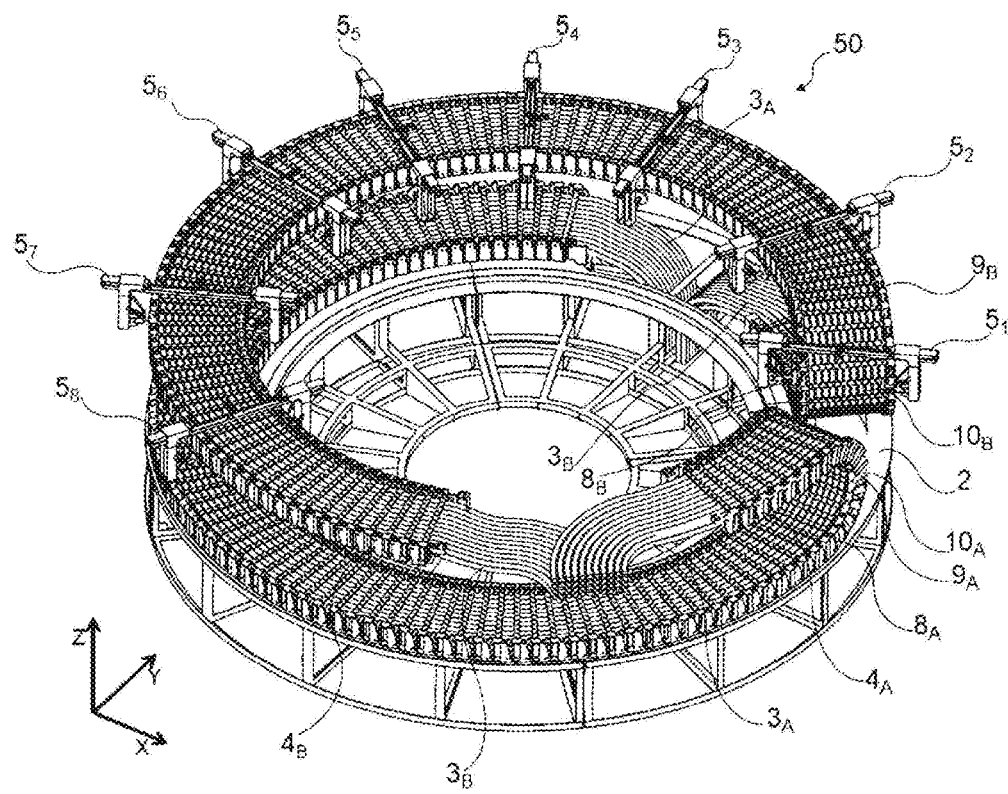
FIG. 28 is a perspective view illustrating the structure of the rotational winding support apparatus according to the first embodiment rotated by 225 degrees, not showing the movable-side member.
Figure 29:
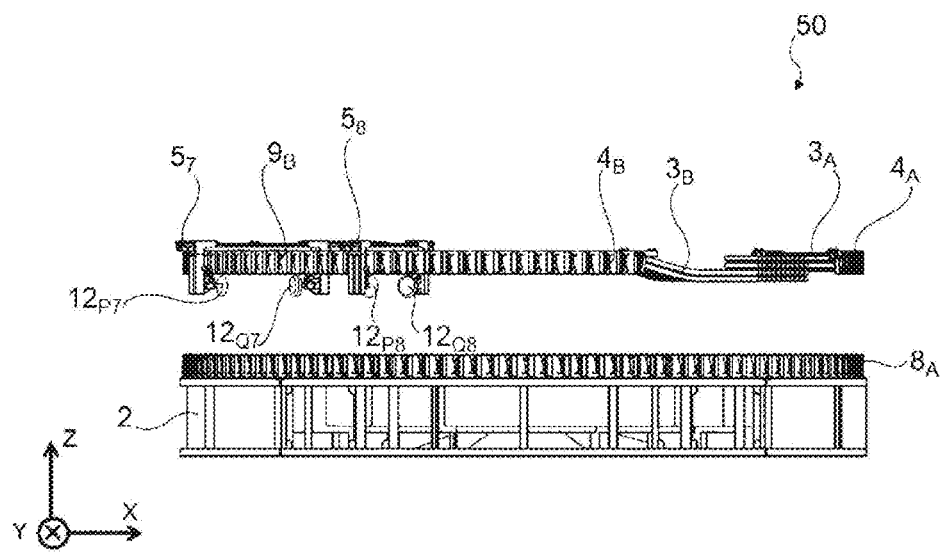
FIG. 29 is a front view illustrating the structure of the rotational winding support apparatus according to the first embodiment rotated by 225 degrees, not showing the movable-side member.
Figure 30:
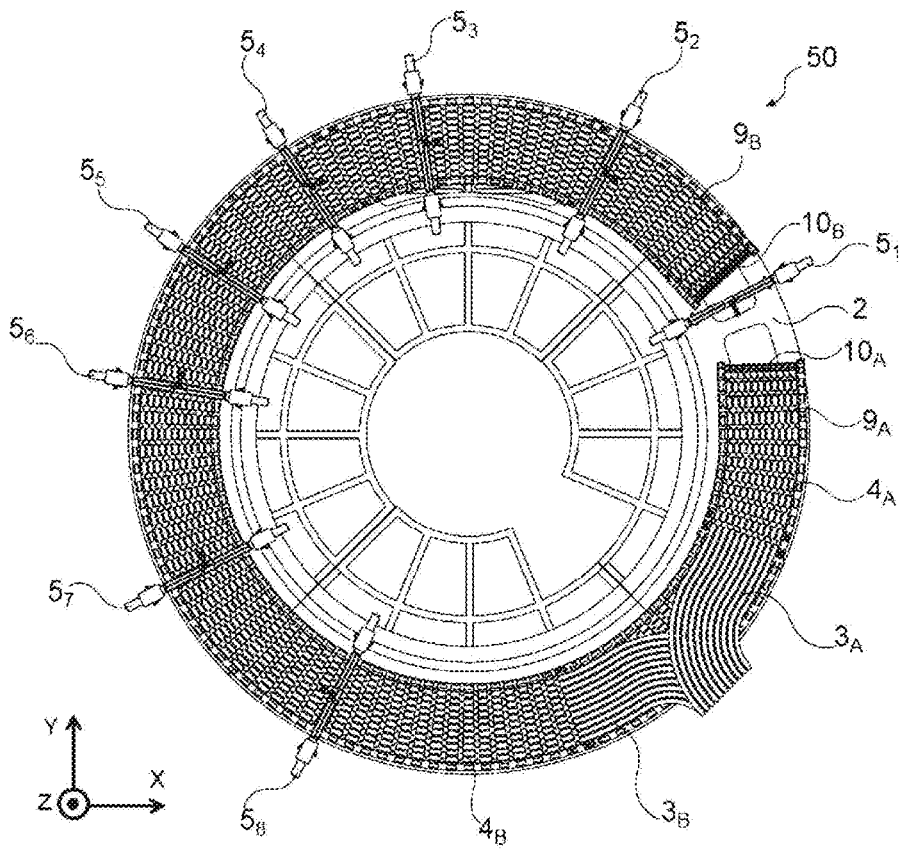
FIG. 30 is a plan view illustrating the structure of the rotational winding support apparatus according to the first embodiment rotated by 225 degrees, not showing the movable-side member.
Figure 31:
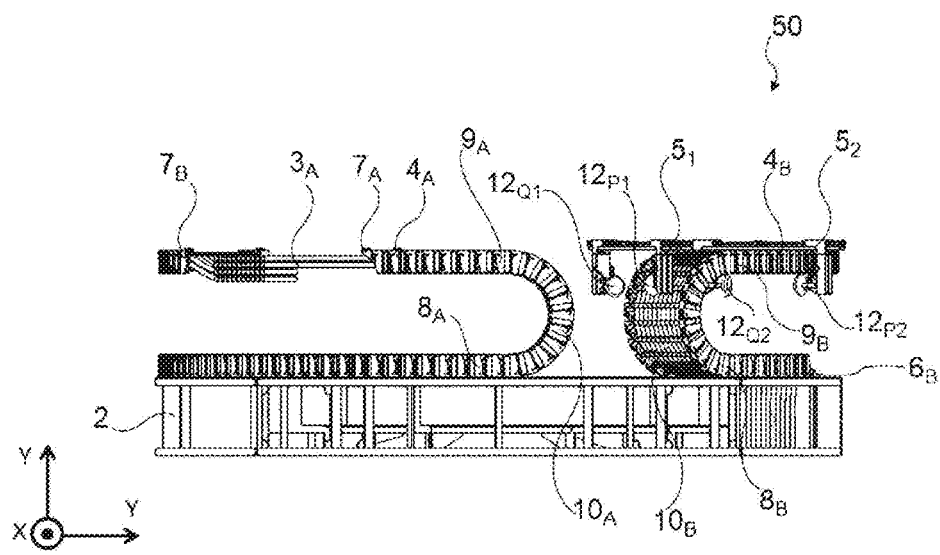
FIG. 31 is a right-side view illustrating the structure of the rotational winding support apparatus according to the first embodiment rotated by 225 degrees, not showing the movable-side member.
Figure 32:
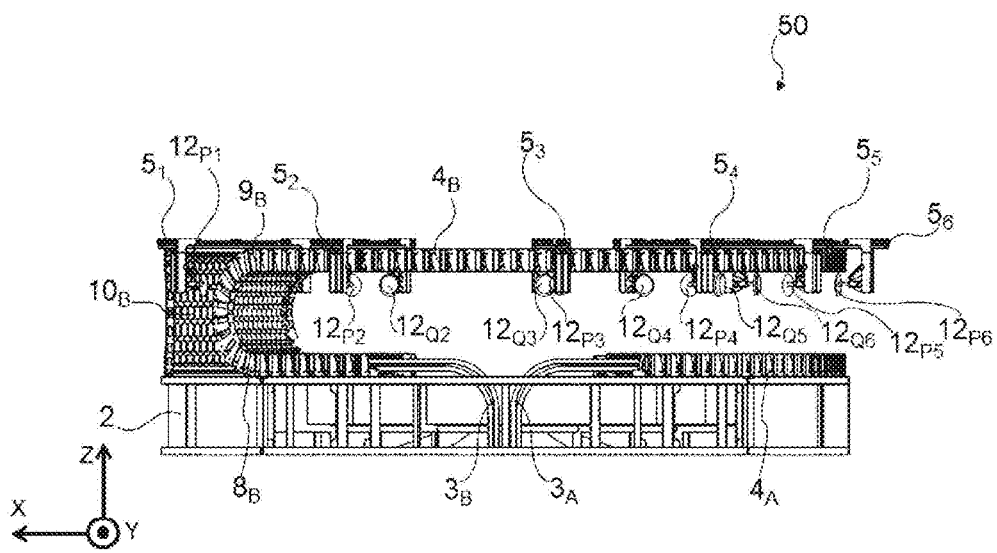
FIG. 32 is a rear view illustrating the structure of the rotational winding support apparatus according to the first embodiment rotated by 225 degrees, not showing the movable-side member.

Referring to FIG. 17 and FIG. 18, how cable guide 4 is moved by rotation of movable-side member 1 is described. FIG. 17 and FIG. 18 are diagrams illustrating how cable guide 4 is moved when movable-side member 1 rotates. In FIG. 17, movable-side member 1 rotates counterclockwise, and in FIG. 18, it rotates clockwise.

FIG. 17(A) and FIG. 18(A) show a state before movable-side member 1 rotates.

FIG. 17(A) and FIG. 18(A) are the same drawing. Cable guide $4_B$ is supported by guide supports $5_6$, $5_7$, and $5_8$. Guide supports 5 are provided at about 2 m intervals whereby the sagging of cable guide $4_B$ can be reduced. When guide supports $5_7$ and $5_8$ are not provided, as indicated by a broken line in FIG. 17(A) and FIG. 18(A), cable guide $4_B$ sags significantly. In FIG. 17(A) and FIG. 18(A), a boundary point Pu between upper guide $9_B$ and bending portion $10_B$ and a boundary point $P_D$ between lower guide $8_B$ and bending portion $10_B$ are depicted by white circles.

When movable-side member 1 rotates counterclockwise, the state shown in FIG. 17(A) is changed to the state shown in FIG. 17(B). Upper guide $9_B$ and guide supports $5_4$, $5_5$, $5_6$, $5_7$, and $5_8$ are moved at the same speed. Upper guide $9_B$ and guide supports $5_4$, $5_5$, $5_6$, $5_7$, and $5_8$ are moved counterclockwise by a distance $L_{MV}$. The distance is a distance on the circumference on which movable-side supporter $7_B$ on the outer peripheral side of movable-side member 1 is moved by rotation. The distance $L_{MV}$ is a distance corresponding to the length of bending portion $10_B$. The portion that has been bending portion $10_B$ (a half on the side closer to upper guide $9_B$) in the state shown in FIG. 17(A) is changed to upper guide $9_B$ in FIG. 17(B). The portion that has been lower guide $8_B$ (on the side closer to bending portion $10_B$) is changed to bending portion $10_B$ in FIG. 17(B). As a result, upper guide $9_B$ becomes longer by a distance $0.5*L_{MV}$. Bending portion $10_B$ is moved counterclockwise by the distance $0.5*L_{MV}$. Lower guide $8_B$ becomes shorter by the distance $0.5*L_{MV}$. Guide support $5_5$ is moved to get ahead of bending portion $10_B$, and guide support $5_5$ supports upper guide $9_B$.

When movable-side member 1 rotates clockwise, the state shown in FIG. 18(A) is changed to the state shown in FIG. 18(B). Upper guide $9_B$ and guide supports $5_4$, $5_5$, $5_6$, $5_7$, and $5_8$ are moved at the same speed. Upper guide $9_B$ and guide supports $5_4$, $5_5$, $5_6$, $5_7$, and $5_8$ are moved clockwise by a distance $L_{MV}$. The portion that has been bending portion $10_B$ (a half on the side closer to lower guide $8_B$) in the state shown in FIG. 18(A) is changed to lower guide $8_B$ in FIG. 18(B). The portion that has been upper guide $9_B$ (on the side closer to bending portion $10_B$) is changed to bending portion $10_B$ in FIG. 18(B). As a result, upper guide $9_B$ becomes shorter by a distance $0.5*L_{MV}$. Bending portion $10_B$ is moved clockwise by the distance $0.5*L_{MV}$. Lower guide $8_B$ becomes longer by the distance $0.5*L_{MV}$. Guide support $5_5$ that has been closest to bending portion $10_B$ is moved away, and guide support $5_6$ becomes closest to bending portion $10_B$.

When movable-side member 1 rotates, in cable guide 4, a portion in which both of lower guide 8 and upper guide 9 are present in the circumferential direction is changed to a portion in which only lower guide 8 or upper guide 9 is present, or a portion in which only lower guide 8 or upper guide 9 is present is changed to a portion in which both of lower guide 8 and upper guide 9 are present. The amount of change in length of the portion in which both of lower guide 8 and upper guide 9 are present is half the amount of movement of upper guide 9.

The moving distance of bending portion 10 is half, compared with the moving distance of movable-side member 1 and guide support 5. Therefore, when movable-side member 1 rotates, guide support 5 is moved to get ahead of bending portion 10. Guide support controller 26 performs control such that the guide support 5 that is getting ahead takes the open position so that guide support 5 does not come into contact with bending portion 10 while getting ahead. When guide support 5 is required to support upper guide 9, guide support controller 26 performs control such that the guide support 5 takes the support position.

As shown in FIG. 17 and FIG. 18, each of guide supports $5_6$, $5_7$, and $5_8$ supports upper guide $9_B$ at a predetermined position. While movable-side member 1 rotates, the position where each of guide supports $5_6$, $5_7$, and $5_8$ supports upper guide $9_B$ does not move. Guide supports $5_6$, $5_7$, and $5_8$ support upper guide $9_B$ at the same predetermined position while supporting upper guide $9_B$. In FIG. 17(B), guide support $5_5$ which supports newly upper guide $9_B$ also supports upper guide $9_B$ at the same predetermined position while supporting upper guide $9_B$.

Each of guide supports 5 is an upper supporter that supports upper guide 9 at a predetermined position of cable guide 4 and is moved with the movement of movable-side member 1 to pass bending portion 10. Rotational winding support apparatus 50 is a support apparatus including a plurality of tubes $3_A$ and $3_B$, cable guides $4_A$ and $4_B$ holding the plurality of tubes $3_A$ and $3_B$, fixed-side member 2, and guide supports 5.

Movable-side member 1 moves rotationally in a range of the rotation angle θ of +225 degrees to −225 degrees. The states of movable-side member 1 rotating from the reference state at θ=0 degrees to θ=225 degrees are shown in FIG. 19 to FIG. 32. FIG. 19 to FIG. 22 are perspective views showing the states of rotation every 45 degrees, not showing the movable-side member. FIG. 23 to FIG. 27 are a perspective view, a front view, a plan view, a right-side view, and a rear view, respectively, of the rotational winding support apparatus rotated by 225 degrees. FIG. 28 to FIG. 32 are a perspective view, a front view, a plan view, a right-side view, and a rear view, respectively, of the rotational winding support apparatus rotated by 225 degrees, not showing the movable-side member.

When movable-side member 1 rotates, bending portions $10_A$ and $10_B$ are moved over an angle being half of the angle by which movable-side member 1 rotates. Therefore, guide supports 5 supporting upper guides $9_A$ and $9_B$ of cable guides $4_A$ and $4_B$ are changed with the rotation angle of movable-side member 1. With rotation by 45 degrees shown in FIG. 19, upper guide $9_A$ is supported by guide supports $5_1$, $5_2$, and $5_3$, and upper guide $9_B$ is supported by guide supports $5_5$, $5_6$, $5_7$, and $5_8$. With rotation by 90 degrees shown in FIG. 20, upper guide $9_A$ is supported by guide supports $5_1$ and $5_2$, and upper guide $9_B$ is supported by guide supports $5_4$, $5_5$, $5_6$, $5_7$, and $5_8$. With rotation by 135 degrees shown in FIG. 21, upper guide $9_A$ is supported by guide supports $5_1$, and upper guide $9_B$ is supported by guide supports $5_3$, $5_4$, $5_5$, $5_6$, $5_7$, and $5_8$. With rotation by 180 degrees shown in FIG. 22, upper guide $9_A$ is supported by guide supports $5_1$, and upper guide $9_B$ is supported by guide supports $5_2$, $5_3$, $5_4$, $5_5$, $5_6$, $5_7$, and $5_8$. With rotation by 225 degrees shown in FIG. 23 to FIG. 32, upper guide $9_A$ is supported by no guide support 5, and upper guide $9_B$ is supported by guide supports $5_1$, $5_2$, $5_3$, $5_4$, $5_5$, $5_6$, $5_7$, and $5_8$.

The operation is described. Cable guides 4 are supported by fixed-side member 2 and guide supports 5. It is determined each guide support 5 supports which of cable guide $4_A$ and $4_B$ (upper guides $9_A$ and $9_B$) or does not support neither of them depending on the position of movable-side member 1. Since a plurality of guide supports 5 support upper guides 9 at intervals determined as appropriate, upper guides 9 do not slag excessively. Since guide supports 5 and cable guides $4_A$ and $4_B$ supported by guide supports 5 are moved together with movable-side member 1, no friction is generated between cable guides $4_A$ and $4_B$ and support rollers 12 also while movable-side member 1 moves.

Since support rollers 12 are rotatable, friction between support rollers 12 and cable guides 4 can be reduced at any time when support rollers 12 start being in contact with cable guide 4 and when they come out of contact with cable guide 4, and when the slagging state of cable guide 4 is changed and cable guide 4 is moved.

When movable-side member 1 rotates, the positional relation between bending portion $10_A$ and $10_B$ of cable guide $4_A$ and $4_B$ and guide support $5_j$ (j=1, 2, ..., 8) changes. When movable-side member 1 rotates, guide support controller 26 also controls each guide support $5_j$ such that support rollers 12 of guide support $5_j$ are not in contact with bending portion $10_A$ and $10_B$. Guide support controller 26 controls the opening and closing of movable frames 13 and performs control such that support rollers 12 can be changed from a state of supporting cable guide $4_A$ or $4_B$ to a state of not supporting or from a state of not supporting to a state of supporting, without support rollers 12 being in contact with bending portion $10_A$ or $10_B$. Guide support controller 26 controls each guide support $5_j$, based on whether or not optical sensors $24_V$ and $24_W$ installed in the guide support $5_j$ receive light rays $25_V$ and $25_W$.

Figure 33:
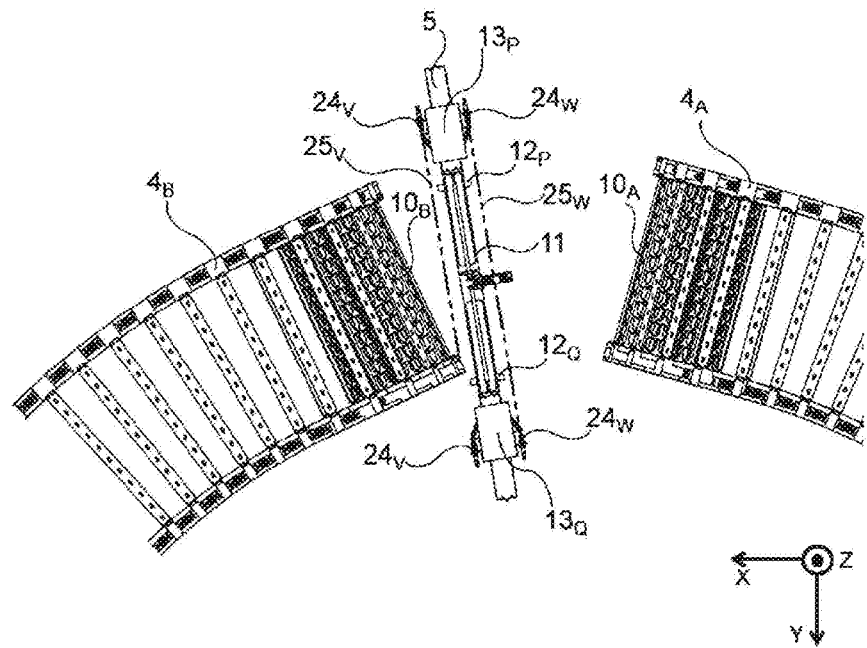
FIG. 33 is a plan view in a state in which the rotational winding support apparatus according to the first embodiment rotates and the optical sensor on one side detects an object.
Figure 34:
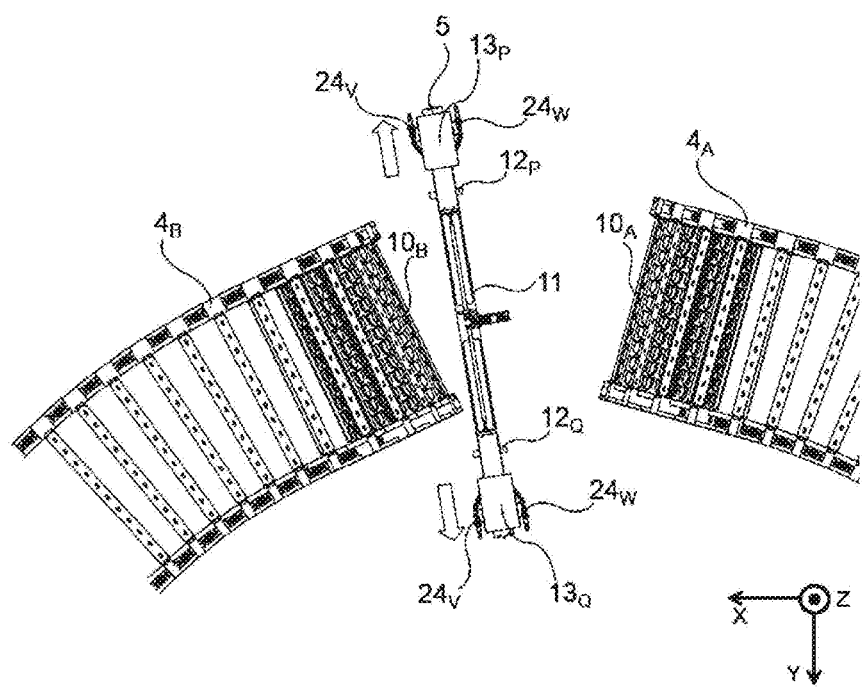
FIG. 34 is a plan view in a state in which the rotational winding support apparatus according to the first embodiment rotates and the optical sensor on one side detects an object to open the guide support.
Figure 35:
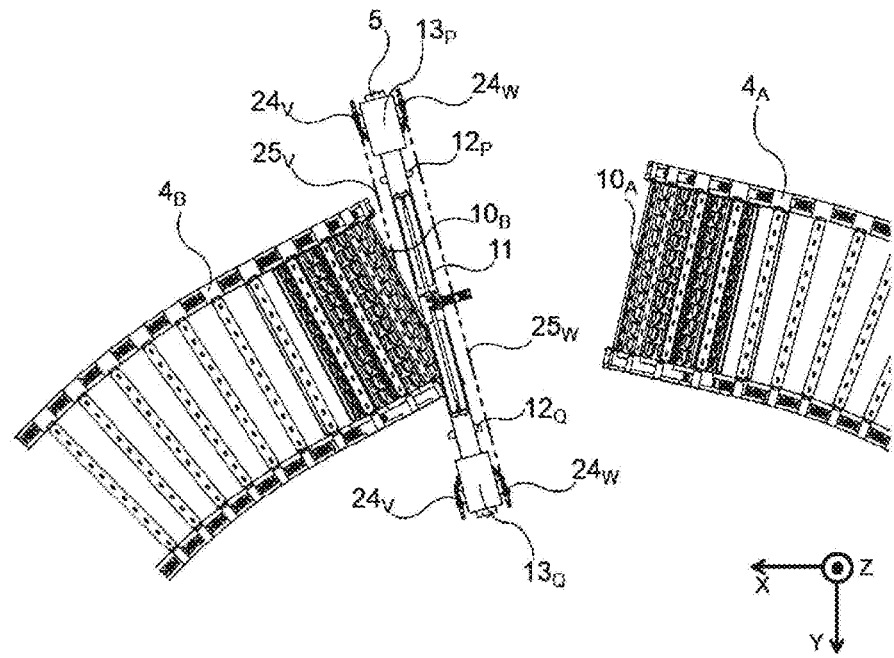
FIG. 35 is a plan view in a state in which the rotational winding support apparatus according to the first embodiment further rotates from FIG. 34.
Figure 36:
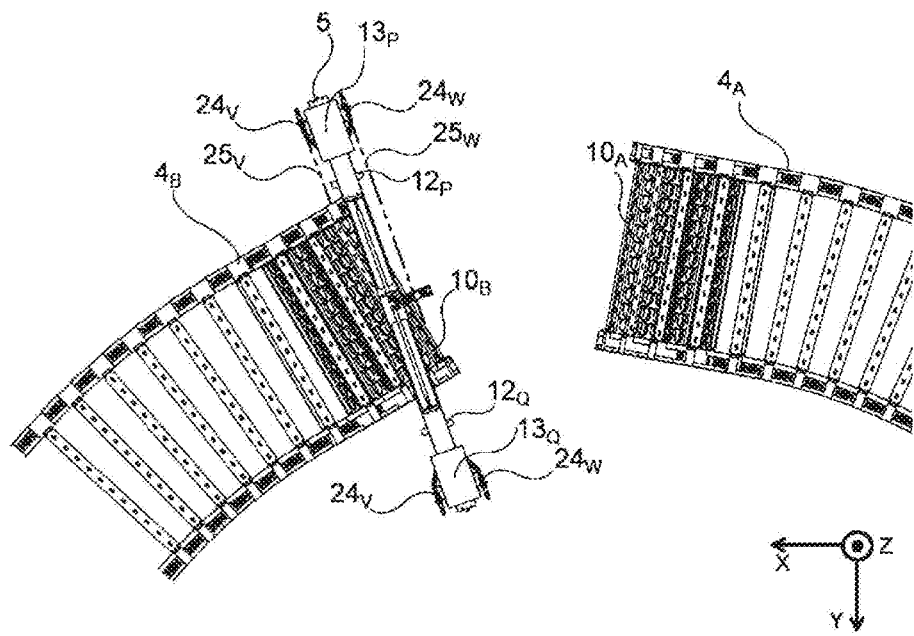
FIG. 36 is a plan view in a state in which the rotational winding support apparatus according to the first embodiment further rotates from FIG. 35 and the optical sensors on both sides detect an object.
Figure 37:
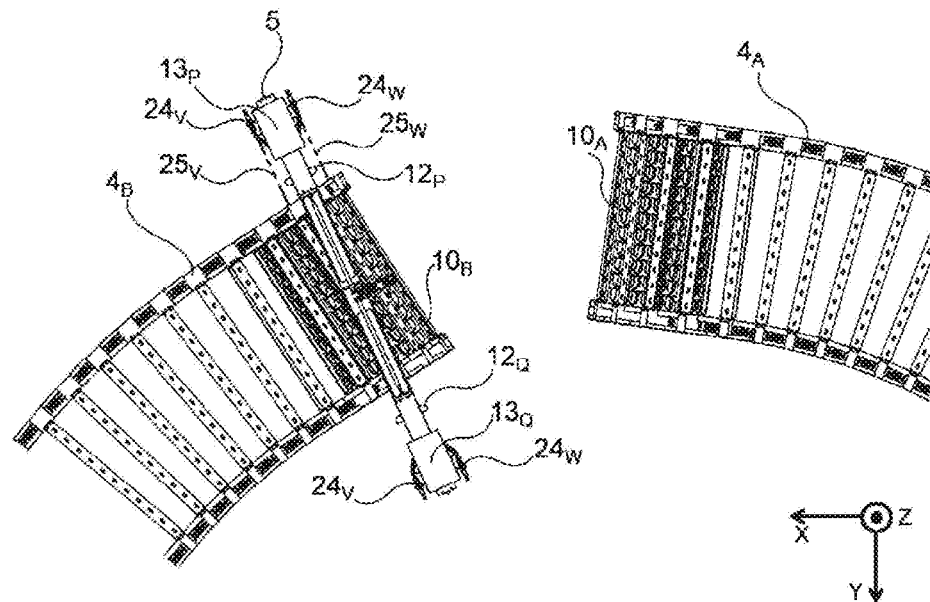
FIG. 37 is a plan view in a state in which the rotational winding support apparatus according to the first embodiment further rotates from FIG. 36.
Figure 38:
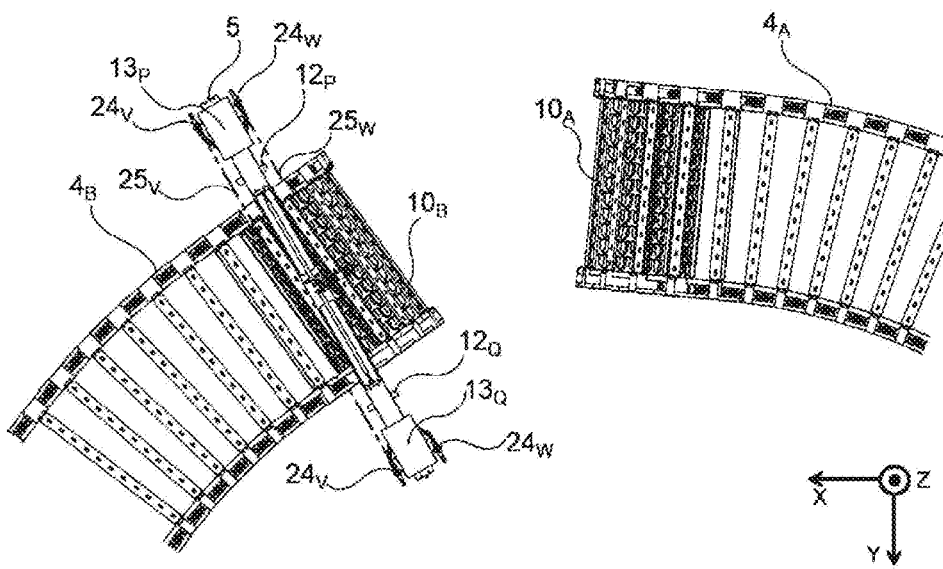
FIG. 38 is a plan view in a state in which the rotational winding support apparatus according to the first embodiment further rotates from FIG. 37 and the optical sensor on the side first detecting an object stops detecting the object.
Figure 39:
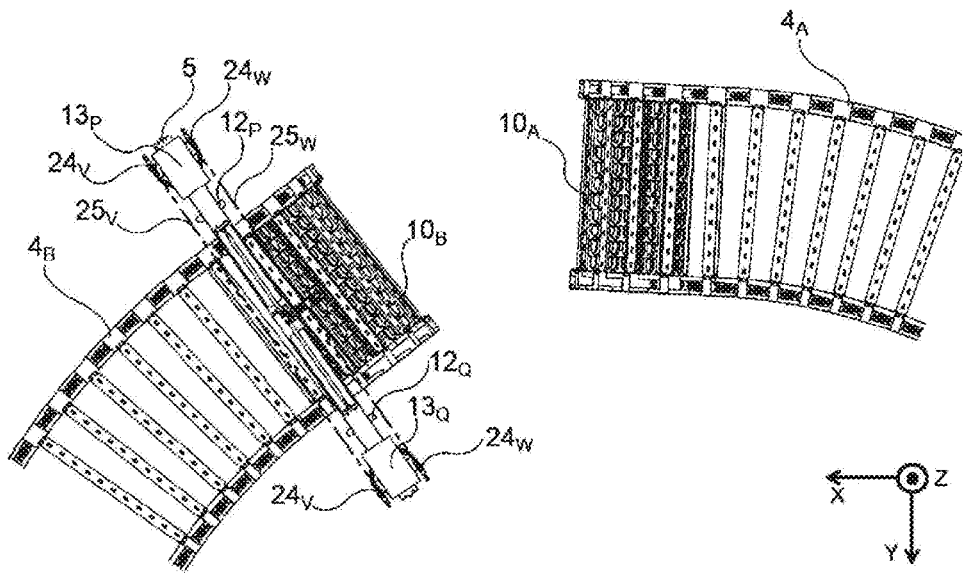
FIG. 39 is a plan view in a state in which the rotational winding support apparatus according to the first embodiment further rotates from FIG. 38 and the optical sensor on neither side detects an object.
Figure 40:
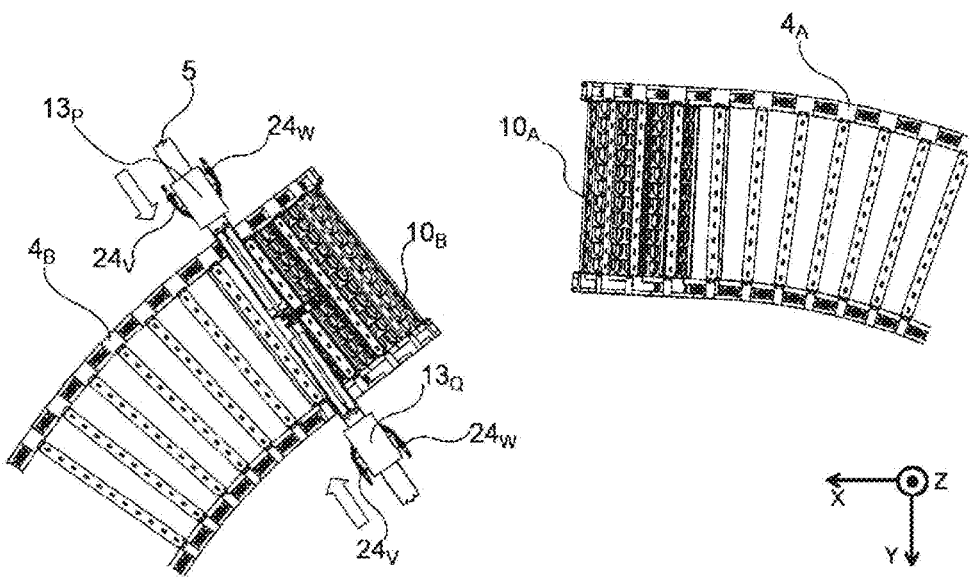
FIG. 40 is a plan view in a state in which the optical sensor on neither side detects an object and the guide support is closed in the rotational winding support apparatus according to the first embodiment.

An example of controlling guide supports 5 is described with reference to FIG. 33 to FIG. 40. FIG. 33 to FIG. 40 show the process in which movable-side member 1 rotates counterclockwise, and guide support 5 that has not supported cable guide $4_A$ or $4_B$ comes to support cable guide $4_B$ without being in contact with bending portion $10_B$. In FIG. 33, optical sensor $24_V$ on the front side of guide support 5 detects an object (bending portion $10_B$). As shown in FIG. 34, guide support controller 26 performs control such that guide support 5 takes the open position. When movable-side member 1 rotates 5 degrees, the state shown in FIG. 34 is changed to the state shown in FIG. 35. In FIG. 35, optical sensor $24_V$ still detects the object, and optical sensor $24_W$ does not detect the object. When movable-side member 1 rotates 5 degrees, the state shown in FIG. 35 is changed to the state shown in FIG. 36. In FIG. 36, both of optical sensors $24_V$ and $24_W$ detect the object. When movable-side member 1 rotates 5 degrees, the state shown in FIG. 36 is changed to the state shown in FIG. 37. In FIG. 37, both of optical sensors $24_V$ and $24_W$ still detect the object. When movable-side member 1 rotates 5 degrees, the state shown in FIG. 37 is changed to the state shown in FIG. 38. In FIG. 38, optical sensor $24_V$ does not detect the object, and optical sensor $24_W$ detects the object. When movable-side member 1 rotates 5 degrees, the state shown in FIG. 38 is changed to the state shown in FIG. 39. In FIG. 38, optical sensors $24_V$ and $24_W$ do not detect the object. In FIG. 39, guide support 5 can be moved to the support position without being in contact with bending portion $10_B$. In the state shown in FIG. 39, guide support controller 26 performs control such that guide support 5 takes the support position. As a result, the state shown in FIG. 40 is taken.

When movable-side member 1 rotates clockwise from the state shown in FIG. 40, guide support 5 takes the support position until the rotation angle being the angle shown in FIG. 38. In FIG. 38, optical sensor $24_V$ on the front side does not detect an object, and optical sensor $24_W$ on the rear side detects an object. When movable-side member 1 further rotates while guide support 5 being kept in the support position, guide support 5 comes into contact with bending portion $10_B$. At the rotation angle shown in FIG. 38, guide support controller 26 performs control such that guide support 5 takes the open position so that guide support 5 does not come into contact with bending portion $10_B$. As a result, as shown in FIG. 38, guide support 5 comes to take the open position. Subsequently, when movable-side member 1 further rotates clockwise, the state shown in FIG. 34 is taken. Movable-side member 1 rotates clockwise while guide support 5 being in the open position, and neither optical sensor $24_V$ nor $24_W$ detects an object at a rotation angle rotated from FIG. 33. At that rotation angle, guide support controller 26 performs control such that guide support 5 takes the support position.

Guide support controller 26 performs control as follows.
(i) In a case in which either optical sensor $24_V$ or $24_W$ detects an object while guide support 5 being in the support position, guide support controller 26 moves movable frames 13 to the open position in guide support 5.
(ii) In a case in which neither optical sensor $24_V$ nor $24_W$ detects an object while guide support 5 being in the open position, guide support controller 26 moves movable frames 13 to the support position in guide support 5.

In a state in which guide support 5 supports neither cable guide $4_A$ nor $4_B$, the guide support controller may perform control such that guide support 5 is in the open position even when neither optical sensor $24_V$ nor $24_W$ detects an object. In order to do so, the angle measurement value $\theta_R$ may be inputted to the guide support controller, and whether or not guide support 5 is in a state of supporting neither cable guide $4_A$ nor $4_B$ may be determined based on the angle measurement value $\theta_R$. Whether or not guide support 5 is in a state of supporting neither cable guide $4_A$ nor $4_B$ may be determined only based on the object detection information from optical sensors $24_V$ and $24_W$.

In a state in which guide support 5 supports neither cable guide $4_A$ nor $4_B$, guide support controller 26A performs control such that guide support 5 is in the open position even if neither optical sensor $24_V$ nor $24_W$ detects an object. Guide support controller 26A detects that guide support 5 in the open position is present at a position to be able to support either cable guide $4_A$ or $4_B$ and moves guide support 5 from the open position to the support position.

Guide support controller 26A performs control as follows, based on the object detection information from optical sensors $24_V$ and $24_W$.
(i) In a case in which either optical sensor $24_V$ or $24_W$ detects an object while guide support 5 being in the support position, guide support controller 26A moves movable frames 13 of guide support 5 to the open position.
(ii-1) In a case in which neither optical sensor $24_V$ nor $24_W$ detects an object without detecting passage of the object, guide support controller 26A moves movable frames 13 of guide support 5 to the support position.
(ii-2) In a case in which passage of one object rotating clockwise and passage of one object rotating counterclockwise are detected after guide support 5 is moved from the support position to the open position, and neither optical sensor $24_V$ nor $24_W$ detects an object, guide support controller 26A moves movable frames 13 of guide support 5 to the support position.
(ii-3) In a case in which passage of two objects is detected successively in the same direction after guide support 5 is moved from the support position to the open position and neither optical sensor $24_V$ nor $24_W$ detects an object, guide support controller 26A moves movable frames 13 of guide support 5 to the support position.

Passage of an object is detected in the following cases. Here, the object detection information $d_V$ and $d_W$ of optical sensors $24_V$ and $24_W$ is denoted as $(d_V, d_W)$. The object detection information $d_V$ and $d_W$ that an object is detected is denoted by $\circ$, and that an object is not detected is denoted by x.

(A) (x, x)→(∘, x)→(∘, ∘)→(x, ∘)→(x, x)
(B) (x, x)→(x, ∘)→(∘, ∘)→(∘, x)→(x, x)

In other words, passage of an object means that after both of optical sensors $24_V$ and $24_W$ are detecting the object simultaneously, that on the side detecting the object earlier stops detecting the object earlier, and neither optical sensor $24_V$ nor $24_W$ detects the object. In the example above, (A) is a case where passage of an object is detected in counterclockwise rotation. (B) is a case where passage of an object is detected in clockwise rotation.

Passage of an object is not detected in the following cases.

(C) (x, x)→(○, x)→(○, ○)→(○, x)→(x, x)
(D) (x, x)→(x, ○)→(○, ○)→(x, ○)→(x, x)
(E) (x, x)→(○, x)→(x, x)
(F) (x, x)→(x, ○)→(x, x)

The state (○, ○) in examples (A) to (D) includes the following cases where each change is repeated one or more times.

(G) (○, ○)→(○, x)→(○, ○)
(H) (○, ○)→(x, ○)→(○, ○)

Examples (E) and (F) are cases where an object is not detected after either optical sensor $24_V$ or $24_W$ detects the object. Examples (C) and (D) are cases where after both of optical sensors $24_V$ and $24_W$ are detecting an object simultaneously, that on the side detecting the object later stops detecting the object earlier, and neither optical sensor $24_V$ nor $24_W$ does not detect the object. The condition (ii-1) is satisfied one of examples (C) to (F) is detected without detecting either examples (A) or (B).

The state in which guide support 5 supports neither cable guide $4_A$ nor $4_B$ is a state in which passage of one object is detected and passage of two objects in the same direction successively is not detected while guide support 5 which is moved from the support position being in the open position. That is, it is the state in which examples (A) or (B) is detected and the condition (ii-2) or (ii-3) is not satisfied.

Guide support controller 26 is an upper supporter opening/closing controller that moves guide support 5 from the support position for supporting upper guide 9 to the open position that is a position never being in contact with bending portion 10 when optical sensors 24 detect that guide support 5 supporting upper guide 9 is close to bending portion 10, and moves guide support 5 to the support position when optical sensors 24 detect that guide support 5 in the open position is present at a distance from bending portion 10.

Guide support controller 26A is an upper supporter opening/closing controller that moves guide support 5 from the support position for supporting upper guide 9 to the open position that is a position never being in contact with bending portion 10 when optical sensor 24 detects that guide support 5 supporting upper guide 9 is close to bending portion 10, and moves guide support 5 to the support position when it is detected that guide support 5 in the open position can support upper guide 9 by moving to the support position, based on the object detection information.

The spacing between support rollers 12 is controlled to be wide in the vicinity of bending portion 10 so that guide support 5 does not come into contact with bending portion 10 of cable guide 4. Therefore, friction caused by guide support 5 being in contact with bending portion 10 can be reduced.

Support rollers 12 of guide support 5 are controlled so as not to come into contact with bending portion 10 when movable-side member 1 rotates. The position of support rollers 12 is controlled based on the object detection information from optical sensors $24_V$ and $24_W$. When optical sensors $24_V$ and $24_W$ or guide support controller 26 is out of order, for example, support rollers 12 come into contact with bending portion 10. Even if support rollers 12 come into contact with bending portion 10, support rollers 12 connected to movable frames 13 rotatably can pass bending portion 10. Therefore, even if guide support 5 comes into contact with cable guide 4, cable guide 4 or guide support 5 is not broken.

Figure 41:
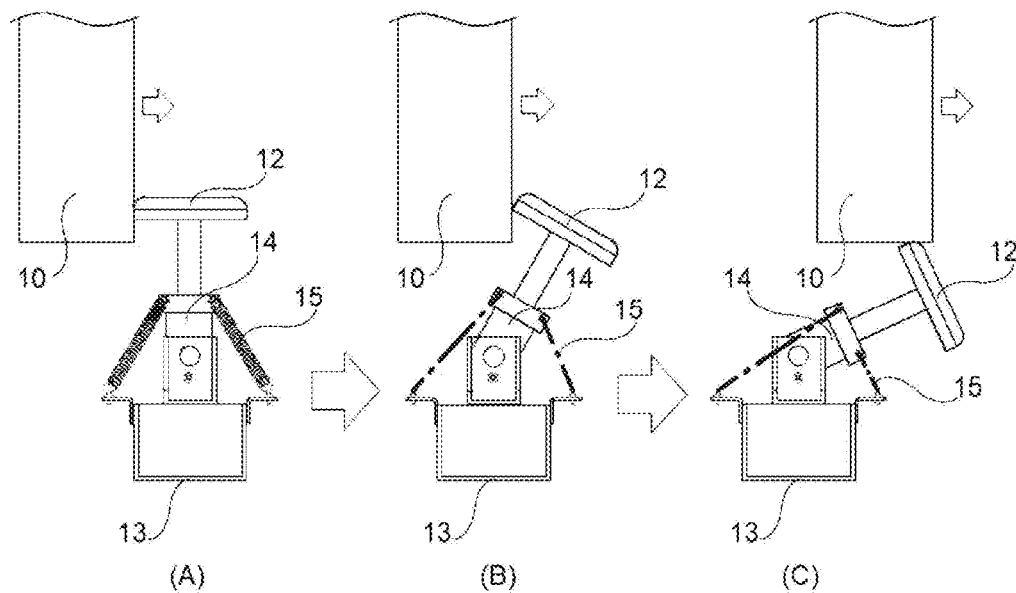
FIG. 41 is a diagram illustrating a process in which the support roller is moved and the guide support passes through a bending portion in the rotational winding support apparatus according to the first embodiment.

Referring to FIG. 41, the process in which support roller 12 coming into contact with bending portion 10 is moved and guide support 5 passes through bending portion 10 is described. In the state shown in FIG. 41(A), support roller 12 is in contact with bending portion 10. Support roller 12 is connected to movable frame 13 rotatably by roller connecting portion 14 and connected to movable frame 13 by two support springs 15. The connection angle between support roller 12 and movable frame 13 becomes smaller than the right angle, and the state shown in FIG. 41(B) is taken. Furthermore, when movable-side member 1 rotates, as shown in FIG. 41(C), support roller 12 is in contact with the side surface of bending portion 10. Although not shown in the drawing, when movable-side member 1 further rotates, support roller 12 comes out of contact with bending portion 10. Support spring 15 then bring support roller 12 into the normal position.

Pipes for use other than the hydraulic mechanism may be protected and held by the cable guide, instead of tubes 3. Cables transmitting power or information may be protected and held by the cable guide, instead of pipes. Cables and pipes may be protected and held by the cable guide.

The support apparatus according to the present disclosure can be applied when the movable-side member moves linearly instead of rotating. When the movable-side member moves linearly instead of moving rotationally, the cable guide having a bending portion and located above and below can be supported by the guide supports being moved together with the movable-side member, thereby achieving reduction in friction between the cable guide and the guide supports.

The foregoing description is applicable to other embodiments.

Second Embodiment

Figure 42:
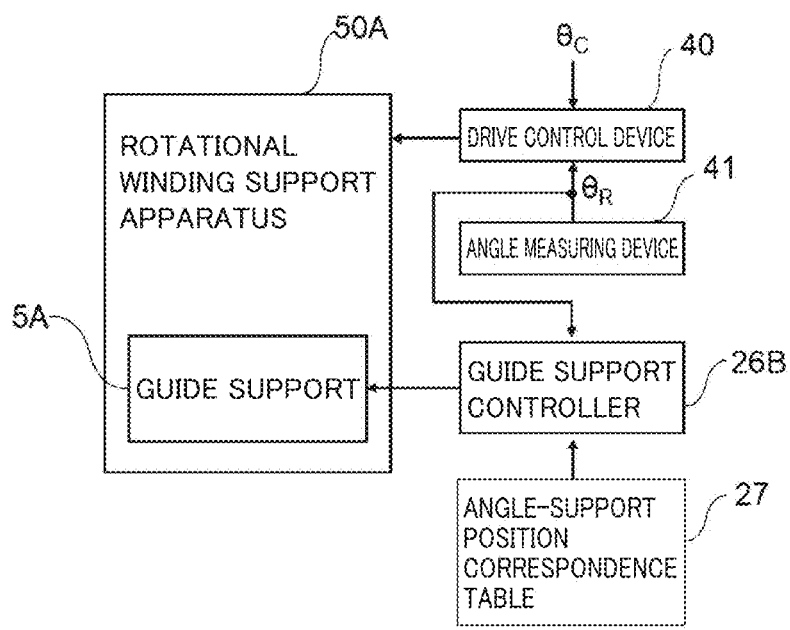
FIG. 42 is a block diagram illustrating a configuration of the control device that controls the rotational winding support apparatus according to a second embodiment.

In a second embodiment, the first embodiment is modified such that the support rollers are controlled to take the support position and the open position, based on the rotation angle of the movable-side member. Referring to FIG. 42, a configuration of the control device that controls a rotational winding support apparatus 50A according to the second embodiment is described. Guide supports 5A of rotational winding support apparatus 50A have no optical sensor 24. Drive control device 40 has the same configuration as the first embodiment and operates similarly.

An angle measurement value $\theta_R$ is inputted to a guide support controller 26B. Guide support controller 26B refers to an angle-support position correspondence table 27 with the inputted angle measurement value $\theta_R$ and determines which of the support position or the open position each guide support 5A is to take. Angle-support position correspondence table 27 is a table in which the rotatable range of rotation angle θ of movable-side member 1 is divided into a plurality of sections and which of the support position or the open position is taken by each guide support 5A is specified in each section.

Figures 43, 44:
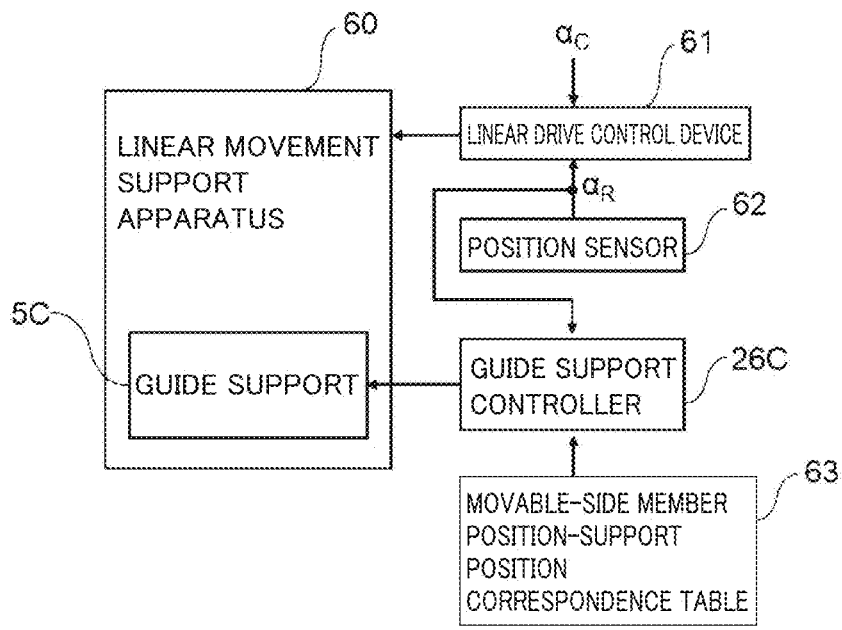
FIG. 43 is a diagram illustrating an example of an angle-support position correspondence table in the control device that controls the rotational winding support apparatus according to the second embodiment.
FIG. 44 is a block diagram illustrating a configuration of the control device that controls a linear drive support apparatus according to a third embodiment.

Referring to FIG. 43, angle-support position correspondence table 27 is described. In angle-support position correspondence table 27, the rotational range +225 degrees to −225 degrees of movable-side member 1 is divided into a plurality of sections. Each section is defined such that the position of any guide support $5A_j$ is different from those in the other sections. FIG. 43 shows three sections in the vicinity of $\theta_R=0$ degrees. Here, $\theta_R$ is measured in units of 0.1 degrees. In the section of 7.5 degrees$\geq\theta_R\geq$−7.5 degrees, as shown in FIG. 1 to FIG. 10, guide supports $5A_4$ and $5A_5$ are in the open position. When movable-side member 1 rotates counterclockwise, the section is changed to the section of 41.8 degrees$\geq\theta_R\geq$7.6 degrees, and guide support $5A_5$ is changed to the support position. In the section of 41.8 degrees$\geq\theta_R\geq$7.6 degrees, guide support $5A_5$ in the support position supports cable guide $4_B$, and guide support $5A_4$ is in the open position. When movable-side member 1 rotates further counterclockwise, guide support $5A_3$ in the support position is not in contact with bending portion $10_A$ while 41.8 degrees$\geq\theta_R$ being satisfied. At $\theta_R\geq$41.9 degrees, if guide support $5A_3$ was in the support position, guide support $5A_3$ would come into contact with bending portion $10_A$, and therefore guide support $5A_3$ is moved to the open position.

Guide support controller 26B refers to angle-support position correspondence table 27 with the inputted angle measurement value $\theta_R$. Referring to angle-support position correspondence table 27, guide support controller 26B acquires the position of guide support $5A_j$ in the section including $\theta_R$. When the position of guide support $5A_j$ at that point of time is different from the position determined by referring to angle-support position correspondence table 27, guide support controller 26B changes the position of guide support $5A_j$.

When the position of guide support $5A_j$ at that point of time is the support position and the position determined by referring to angle-support position correspondence table 27 with the angle measurement value $\theta_R$ is the open position, it is detected that guide support $5A_j$ is close to bending portion 10, based on the rotation angle. When it is detected that bending portion 10 is close to, guide support controller 26B moves guide support $5A_j$ from the support position to the open position.

When the position of guide support $5A_j$ at that point of time is the open position and the position determined by referring to angle-support position correspondence table 27 with the angle measurement value $\theta_R$ is the support position, it is detected that guide support $5A_j$ in the open position can support upper guide 9 by moving to the support position, based on the detection angle. When it is detected that guide support $5A_j$ can support upper guide 9, guide support controller 26B moves guide support $5A_j$ from the open position to the support position.

Referring to angle-support position correspondence table 27 simplifies the processing in guide support controller 26B. Angle-support position correspondence table 27 specifies which of the support position or the open position is to be taken for all the guide supports 5 for each angle section. The angle-support position correspondence table may specify a section of angles that is the support position or the open position for each guide support 5. The angle-support position correspondence table may be any table that can determine which of the support position and the open position each guide support 5 is to take, for the angle measurement value $\theta_R$. Which of the support position and the open position each guide support 5 is to take for the angle measurement value $\theta_R$ can be determined by a method that does not use the angle-support position correspondence table.

Guide support controller 26B is an upper supporter opening/closing controller that moves guide support $5A_j$ being close to bending portion 10 from the support position for supporting upper guide 9 to the open position that is a position never being in contact with bending portion 10 when it is detected that any guide support $5A_j$ is close to bending portion 10 based on the rotation angle, and moves guide support $5A_j$ from the open position to the support position when it is detected that guide support $5A_j$ in the open position can support upper guide 9 by moving to the support position, based on the rotation angle.

In a case in which the guide support controller detects that guide support $5A_j$ in the open position is present at a distance from bending portion 10, based on the rotation angle, guide support $5A_j$ may be moved from the open position to the support position. In such a case, angle-support position correspondence table 27 specifies that guide support $5A_j$ takes the support position at the rotation angle at which guide support $5A_j$ is positioned away from bending portion 10. The rotation angle at which guide support $5A_j$ is positioned away from bending portion 10 is a rotation angle having an appropriate allowance angle to the range of rotation angles in which guide support $5A_j$ intersects bending portion 10.

Since guide support 5 is controlled based on the rotation angle of movable-side member 1, a sensor for detecting the bending portion becomes unnecessary. Since the sensor is unnecessary, the structure of the rotational winding support apparatus can be simplified.

The foregoing description is applicable to other embodiments.

Third Embodiment

In a third embodiment, the movable-side member moves linearly and the support rollers are controlled to take the support position and the open position based on the position of the movable-side member. Referring to FIG. 44, the configuration of a linear drive support apparatus and the control device therefore according to the third embodiment is described.

Although not shown in the drawing, a linear movement support apparatus 60 has a structure to allow a movable-side member 1C to move linearly. Therefore, in linear movement support apparatus 60, a fixed-side member 2C and movable-side member 1C are provided linearly. Movable-side member 1C moves in a space above fixed-side member 2C.

Guide supports 5C are provided at predetermined intervals above fixed-side member 2C so as to intersect movable-side member 1C. Guide supports 5C have a structure similar to guide supports 5A in the second embodiment.

Tube 3C has one end connected to fixed-side member 2C and the other end connected to movable-side member 1C. Cable guide 4C also has one end connected to fixed-side member 2C and the other end connected to movable-side member 1C. Cable guide 4C is also a protective frame connected body in which protective frames similar to those in the first and second embodiments are connected in the extending direction flexibly to protect tube 3C flexibly. Cable guide 4C has a lower guide 8C, an upper guide 9C, and a bending portion 10C. Lower guide 8C is placed on the upper surface of fixed-side member 2C. Upper guide 9C is supported by guide supports 5C. Bending portion 10C is a portion of cable guide 4C at which the protective frame bodies are bent in an arc shape. Bending portion 10C is present between lower guide 8C and upper guide 9C. A plurality of protective frame bodies are connected while being bent at bending portion 10C, whereby upper guide 9C is present in the space above lower guide 8C.

A linear drive control device 61 moves linear drive support apparatus 60 linearly such that the position specified by a position command value ac is taken. The position command value lac is inputted from external. A position sensor 62 detects the position $\alpha_R$ of movable-side member 1C relative to fixed-side member 2C. Position sensor 62 is a movable-side member position acquirer that detects a movable-side member position that is a position of movable-side member 1C relative to fixed-side member 2C.

The movable-side member position $\alpha_R$ is inputted to guide support controller 26C. Guide support controller 26C refers to a movable-side member position-support position correspondence table 63 with the inputted movable-side member position $\alpha_R$ to determine which of the support position or the open position each guide support 5C is to take, and controls each guide support 5C such that the determined position is taken.

Movable-side member position-support position correspondence table 63 is a table in which the movable range of movable-side member position $\alpha_R$ is divided into a plurality of sections and which of the support position or the open position is taken by each guide support 5C is specified for each section.

Guide support controller 26C is an upper supporter opening/closing controller that moves guide support $5C_j$ being close to bending portion 10C from the support position for supporting upper guide 9C to the open position that is a position never being in contact with bending portion 10C when it is detected that any guide support $5C_j$ is close to bending portion 10C, based on the movable-side member position $\alpha_R$, and moves guide support $5C_j$ from the open position to the support position when it is detected that guide support $5C_j$ in the open position can support upper guide 9C by moving to the support position, based on the movable-side member position.

In a case in which the guide support controller detects that guide support $5C_j$ in the open position is present at a distance from bending portion 10, based on the movable-side member position, guide support $5C_j$ may be moved from the open position to the support position. In such a case, movable-side member position-support position correspondence table 63 specifies that guide support $5C_j$ takes the support position at the movable-side member position at which guide support $5C_j$ is positioned away from bending portion 10. The movable-side member position at which guide support $5C_j$ is positioned away from bending portion 10 is a movable-side member position away from the range of movable-side member position at which guide support $5C_j$ intersects bending portion 10 by an appropriate allowance angle.

The position at which guide support 5C supports upper guide 9C is a predetermined positions. Guide support 5C supports upper guide 9C at a predetermined position. Guide support 5C supports the same position of upper guide 9C while supporting upper guide 9C. Therefore, friction between guide support 5C and upper guide 9C can be reduced. Since cable guide 5C is not in contact with bending portion 10C, friction caused by cable guide 5C being in contact with bending portion 10C can be reduced.

The embodiments can be combined freely, or the embodiments are subject to modification and omission of some of constituent elements, or the embodiments with some of constituent elements eliminated or modified may be combined freely.

REFERENCE SIGNS LIST 50, 50A rotational winding support apparatus (support apparatus),
1, 1C movable-side member,
2, 2C fixed-side member (lower supporter),
3, $3_A$, $3_B$, 3C tube (protection target),
4, $4_A$, $4_B$, 4C cable guide (protective frame connected body),
5, $5_1$, $5_2$, $5_3$, $5_4$, $5_5$ guide support (upper supporter),
$5_6$, $5_7$, $5_8$ guide support (upper supporter),
5A, 5C guide support (upper supporter),
$6_A$, $6_B$ fixed-side supporter,
$7_A$, $7_B$ movable-side supporter,
$8_A$, $8_B$, 8C lower guide (lower side of protective frame connected body),
$9_A$, $9_B$, 9C upper guide (upper side of protective frame connected body),
$10_A$, $10_B$, 10C bending portion,
11 base frame,
12, $12_P$, $12_Q$, $12_{P1}$, $12_{Q1}$, $12_{P2}$, $12_{Q2}$ support roller,
$12_{P3}$, $12_{Q3}$, $12_{P4}$, $12_{Q4}$, $12_{P5}$, $12_{Q5}$ support roller,
$12_{P6}$, $12_{Q6}$, $12_{P7}$, $12_{Q7}$, $12_{P8}$, $12_{Q8}$ support roller,
13, $13_P$, $13_Q$ movable frame,
14, $14_P$, $14_Q$ roller connecting portion,
15 support spring,
16, $16_P$, $16_Q$ LM guide actuator,
17 motor,
18 gear,
19, $19_P$, $19_Q$ shaft,
20 body,
21 screw rod,
22 movable portion,
23 guide plate portion,
24, $24_V$, $24_W$ optical sensor (detection sensor),
25, $25_V$, $25_W$ light ray,
26, 26A, 26B, 26C guide support controller (upper supporter opening/closing controller),
27 angle-support position correspondence table,
40 drive control device,
41 angle measuring device (rotation angle acquirer),
60 linear movement support apparatus (support apparatus),
61 linear drive control device,
62 position sensor (movable-side member position acquirer)
63 movable-side member position-support position correspondence table.

The invention claimed is:
1. A support apparatus comprising:
a protective frame connected body to hold a plurality of protection targets flexibly, each of the plurality of protection targets being a flexible cable or pipe having one end connected to a fixed-side member and the other end connected to a movable-side member that moves relative to the fixed-side member, the protective frame connected body including a plurality of protective frame bodies connected flexibly in an extending direction that is a direction in which the protection targets extend, each of the plurality of protective frame bodies having a plurality of holes to allow the plurality of protection targets to pass through and having a predetermined length in the extending direction, the protective frame connected body having a bending portion bent in a middle, an upper side and a lower side of the protective frame connected body being overlapped vertically;
a lower supporter to support the lower side of the protective frame connected body;
a plurality of upper supporters, each of the plurality of upper supporters supporting the upper side of the protective frame connected body at a predetermined position of the protective frame connected body and being moved by movement of the movable-side member to pass the bending portion without being in contact with the bending portion;
a plurality of detection sensors, each of the plurality of detection sensors to detect the bending portion present at a predetermined position relative to each of the plurality of upper supporters; and
an upper supporter opening/closing controller to move each of the plurality of upper supporters from a support position for supporting the upper side of the protective frame connected body to an open position that is a position never being in contact with the bending portion when the detection sensor detects that any of the plurality of the upper supporters supporting the upper side of the protective frame connected body is close to the bending portion, and to move the upper supporter to the support position when it is detected that the upper supporter in the open position is able to support the upper side of the protective frame connected body by moving to the support position, based on object detection information that is information indicating whether or not the bending portion detected by the detection sensor is present at the predetermined position.

2. The support apparatus according to claim 1, wherein
the movable-side member moves rotationally,
the protective frame connected body is bent in an arc shape,
the lower supporter is provided in an arc shape, and
the plurality of upper supporters are provided to intersect the protective frame connected body in an arc shape.

3. The support apparatus according to claim 2, comprising two protective frame connected bodies,
wherein the two protective frame connected bodies are arranged such that the bending portions of the two protective frame connected bodies are adjacent to each other.

4. The support apparatus according to claim 1, wherein
the movable-side member moves linearly,
the lower supporter is provided linearly, and
the plurality of upper supporters are provided above the lower supporter.

5. The support apparatus according to claim 1, wherein each of the plurality of upper supporters is provided such that the upper supporter is pushed and moved by the bending portion being in contact, and that the upper supporter is able to pass the bending portion.

\* \* \* \* \*